US012713484B2

(12) United States Patent
Seo et al.

(10) Patent No.: US 12,713,484 B2
(45) Date of Patent: Aug. 18, 2026

(54) METHOD AND DEVICE FOR UWB COMMUNICATION

(71) Applicant: Samsung Electronics Co., Ltd., Gyeonggi-do (KR)

(72) Inventors: Jinwook Seo, Gyeonggi-do (KR); Jonghoe Koo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 607 days.

(21) Appl. No.: 17/974,897

(22) Filed: Oct. 27, 2022

(65) Prior Publication Data

US 2023/0128414 A1 Apr. 27, 2023

(30) Foreign Application Priority Data

Oct. 27, 2021 (KR) ........................ 10-2021-0145044

(51) Int. Cl.

| | |
|---|---|
| ***H04W 76/18*** | (2018.01) |
| ***H04B 1/69*** | (2011.01) |
| ***H04L 5/00*** | (2006.01) |
| ***H04W 28/02*** | (2009.01) |
| ***H04W 72/04*** | (2023.01) |
| ***H04W 72/12*** | (2023.01) |
| ***H04W 72/23*** | (2023.01) |
| ***H04W 72/50*** | (2023.01) |
| ***H04W 80/02*** | (2009.01) |

(52) U.S. Cl.
CPC ........... *H04W 76/18* (2018.02); *H04L 5/0048* (2013.01); *H04W 72/23* (2023.01)

(58) Field of Classification Search
CPC ..... H04W 24/10; H04W 4/025; H04W 4/023; H04W 76/18; H04W 72/23; H04W 76/10; H04W 64/006; H04W 4/021; H04W 64/003; H04W 8/005; G01S 5/10
USPC .......................................................... 370/229
See application file for complete search history.

(56) References Cited

U.S. PATENT DOCUMENTS

2014/0342670 A1 11/2014 Kang et al.
2015/0289077 A1* 10/2015 Ko .......................... H04W 4/60 455/420
2019/0274130 A1 9/2019 Cheng et al.
2020/0014526 A1 1/2020 Hammerschmidt et al.
(Continued)

FOREIGN PATENT DOCUMENTS

KR 1020120047168 5/2012
KR 10-2014-0135569 11/2014
WO WO 2020/226423 11/2020

OTHER PUBLICATIONS

Rolfe (BCA) et al., “TG4m Merged MAC Proposal”, IEEE P802.15, Wireless Personal Area Networks, Sep. 2012, 55 pages.
(Continued)

*Primary Examiner* — Marcus Smith
*Assistant Examiner* — Jason A Harley
(74) *Attorney, Agent, or Firm* — The Farrell Law Firm, P.C.

(57) ABSTRACT

A method for resetting the configuration for a downlink time difference of arrival is provided, including a method by an ultra-wide band (UWB) device that includes generating a UWB message for resetting a configuration for a multi-cluster and transmitting the UWB message. The UWB message may include information used to indicate that the UWB message is a configuration message for resetting the configuration for the multi-cluster.

20 Claims, 31 Drawing Sheets

(56) References Cited

U.S. PATENT DOCUMENTS

| | | | | |
|---|---|---|---|---|
| 2020/0150262 | A1 | 5/2020 | Kim et al. | |
| 2020/0200862 | A1* | 6/2020 | Li | H04W 4/029 |
| 2020/0284897 | A1* | 9/2020 | Padaki | G01S 7/006 |
| 2021/0282112 | A1* | 9/2021 | Zhan | H04W 64/00 |
| 2022/0039052 | A1* | 2/2022 | Choi | G01S 13/765 |
| 2022/0070613 | A1* | 3/2022 | Barton | G01S 5/0236 |
| 2022/0137177 | A1* | 5/2022 | Hammerschmidt | G01S 13/003<br>455/456.1 |
| 2022/0295430 | A1* | 9/2022 | Schober | G01S 13/765 |

OTHER PUBLICATIONS

IEEE Standard for Low-Rate Wireless Networks, Amendment 1: Enhanced Ultra Wideband (UWB) Physical Layers (PHYs) and Associated Ranging Techniques, Jun. 2020, 174 pages.
European Search Report dated Jan. 8, 2025 issued in counterpart application No. 22887635.5-1206, 7 pages.
International Search Report dated Feb. 6, 2023 issued in counterpart application No. PCT/KR2022/016546, 6 pages.

* cited by examiner

FIG. 8B
800b
810
SYNC
820
SFD
Gap
830
STS
Gap
840
MHR
850a
Payload IE1
850b
Payload IE2
MAC payload
850
860
MFR

900a

| Parameter | Size (bits) | Notes |
|---|---|---|
| Vendor OUI | 24 | 0x5A18FF |
| UWB Message ID | 4 | 0x07 = OWR Message |
| OWR Message Type | 4 | 0x0: UL-TDoA Blink message<br>0x1: UL-TDoA Synchronization message<br>0x2: Poll DL-TDoA Message<br>0x3: Response DL-TDoA Message<br>0x4: Final DL-TDoA Message<br>0x5: AoA Measurement message<br>0x6-0xF: RFU |
| Message Control | 16 | Configuration of the message as defined in Table X2 |
| Block Index | 16 | Block index of the current ranging block |
| Round Index | 16 | Round index of the current ranging round |
| TX Timestamp | 64 | Transmission timestamp (in units of 15.65 ps) in the common time base |
| Ranging Device Management List | 0/24*N | N Ranging Device Management List Elements as defined in Table X3 |
| CFO | 0/16 | Clock frequency offset with respect to Initiator (in the unit of ppm) |
| Reply Time List | 0/48*N | M Reply Time List Elements. |
| Responder Reply Time | 0/32 | Reply time of responder in the common time base |
| Inter-cluster synchronization | 0/40 | Parameters used for multi-hop time synchronization in multi-cluster scenarios as defined in Table X5 |
| Anchor Location | 0/152 | The geo-location information of Anchor as defined in Table X6 |
| Vendor-specific Data | variable | Any vendor-specific data |

| Parameter | Size (bits) | Notes |
|---|---|---|
| Vendor OUI | 24 | 0x5A18FF |
| UWB Message ID | 4 | 0x07 = OWR Message |
| OWR Message Type | 2 | 0 - Downlink TDoA message |
| Message Type | 2 | 0 : Poll<br>1 : Resp<br>2 : Final<br>3 : Managemant |
| Message Control | 16 | Configuration of the message as defined in Table X2 |
| Block Index | 16 | Block index of the current ranging block |
| Round Index | 16 | Round index of the current ranging round |
| TX Timestamp | 64 | Transmission timestamp (in units of 15.65 ps) in the common time base |
| Ranging Device Management List | 0/24*N | N Ranging Device Management List Elements as defined in Table X3 |
| CFO | 0/16 | Clock frequency offset with respect to Initiator (in the unit of ppm) |
| Reply Time List | 0/48*N | M Reply Time List Elements. |
| Responder Reply Time | 0/32 | Reply time of responder in the common time base |
| Inter-cluster synchronization | 0/40 | Parameters used for multi-hop time synchronization in multi-cluster scenarios as defined in Table X5 |
| Anchor Location | 0/152 | The geo-location information of Anchor as defined in Table X6 |
| Vendor-specific Data | variable | Any vendor-specific data |
| Configure Parameter | N | Parameter for Configuration. |

| Parameter | Size (bits) | Notes |
|---|---|---|
| Vendor OUI | 24 | 0x5A18FF |
| UWB Message ID | 4 | 0x07 = OWR Message |
| OWR Message Type | | 0x0: UL-TDoA Blink message<br>0x1: UL-TDoA Synchronization message<br>0x2: Poll DL-TDoA Message<br>0x3: Response DL-TDoA Message<br>0x4: Final DL-TDoA Message<br>0x5: AoA Measurement message<br>0x6: Management<br>0x7-0xF: RFU |
| Message Control | 16 | Configuration of the message as defined in Table X2 |
| Block Index | 16 | Block index of the current ranging block |
| Round Index | 16 | Round index of the current ranging round |
| TX Timestamp | 64 | Transmission timestamp (in units of 15.65 ps) in the common time base |
| Ranging Device Management List | 0/24*N | N Ranging Device Management List Elements as defined in Table X3 |
| CFO | 0/16 | Clock frequency offset with respect to Initiator (in the unit of ppm) |
| Reply Time List | 0/48*N | M Reply Time List Elements. |
| Responder Reply Time | 0/32 | Reply time of responder in the common time base |
| Inter-cluster synchronization | 0/40 | Parameters used for multi-hop time synchronization in multi-cluster scenarios as defined in Table X5 |
| Anchor Location | 0/152 | The geo-location information of Anchor as defined in Table X6 |
| Vendor-specific Data | variable | Any vendor-specific data |
| Configure Parameter | N | Parameter for Configuration. |

| Parameter | Size (bits) | Notes |
|---|---|---|
| Ranging Device Management List Length | 4 | Number of elements in the ranging device management list field |
| Reply Time List Length | 4 | Number of elements in the Reply Time List field |
| CFO Present | 1 | Presence of CFO<br>0: CFO not present<br>1: CFO is present |
| Cost Metric Present | 1 | 0: Cost Metric not present<br>1: Cost Metric is present<br>If cost metric is present, routing sequence number should be present. |
| Inter-Cluster Synchronization | 1 | 0: Inter-Cluster synchronization is not present<br>1: Inter-Cluster synchronization is present |
| Anchor Location present | 1 | 0: Anchor Location field is not present<br>1: Anchor Location field is present |
| Vendor-specific data present | 1 | 0: Vendor-specific data field is not present<br>1: Vendor-specific data field is present |
| Configure Parameter Present bit | 1 | 0: Configure Parameter is not present<br>1: Configure Parameter is present |

| Parameter | Size (bits) | Notes |
|---|---|---|
| Round Index | 16 | Round index of ranging round list |
| Initiator Index | 16 | Initiator index of current ranging round |
| Responder Index List | 16*n (Number of Responder) | Responder index list of current ranging round |

1000

| | Parameter | Size (bits) | Notes |
|---|---|---|---|
| | Vendor OUI | 24 | 0x5A18FF |
| 1010 | UWB Message ID | 4 | 0x07 = OWR Message |
| 1020 | OWR Message Type | 2 | 0 - Downlink TDoA message |
| 1030 | Message Type | 2 | 0 : Poll<br>1 : Resp<br>2 : Final<br>3 : Managemant |
| 1040 | Message Control | 16 | Configuration of the message as defined in Table X2 |
| | Block Index | 16 | Block index of the current ranging block |
| 1050 | Round Index | 16 | Round index of the current ranging round |
| | TX Timestamp | 64 | Transmission timestamp (in units of 15.65 ps) in the common time base |
| 1060 | Ranging Device Management List | 0/24*N | N Ranging Device Management List Elements as defined in Table X3 |
| | CFO | 0/16 | Clock frequency offset with respect to Initiator (in the unit of ppm) |
| | Reply Time List | 0/48*N | M Reply Time List Elements. |
| | Responder Reply Time | 0/32 | Reply time of responder in the common time base |
| | Inter-cluster synchronization | 0/40 | Parameters used for multi-hop time synchronization in multi-cluster scenarios as defined in Table X5 |
| | Anchor Location | 0/152 | The geo-location information of Anchor as defined in Table X6 |
| | Vendor-specific Data | variable | Any vendor-specific data |

| Parameter | Size (bits) | Notes |
|---|---|---|
| Ranging Device Management List Length | 4 | Number of elements in the ranging device management list field |
| Reply Time List Length | 4 | Number of elements in the Reply Time List field |
| CFO Present | 1 | Presence of CFO<br>0: CFO not present<br>1: CFO is present |
| Cost Metric Present | 1 | 0: Cost Metric not present<br>1: Cost Metric is present<br>If cost metric is present, routing sequence number should be present. |
| Inter-Cluster Synchronization | 1 | 0: Inter-Cluster synchronization is not present<br>1: Inter-Cluster synchronization is present |
| Anchor Location present | 1 | 0: Anchor Location field is not present<br>1: Anchor Location field is present |
| Vendor-specific data present | 1 | 0: Vendor-specific data field is not present<br>1: Vendor-specific data field is present |
| Configure Parameter Present bit | 1 | 0: Configure Parameter is not present<br>1: Configure Parameter is present |

| | Parameter | Size (bits) | Notes |
|---|---|---|---|
| | Vendor OUI | 24 | 0x5A18FF |
| 1110 | UWB Message ID | 4 | 0x07 = OWR Message |
| 1120 | OWR Message Type | 2 | 0 - Downlink TDoA message<br>1 – Management message |
| 1130 | Message Type | 2 | 0 : Poll<br>1 : Resp<br>2 : Final<br><br>if OWR Message Type == 1<br>0: stop, 1: configure, 2: restart |
| 1140 | Message Control | 16 | Configuration of the message as defined in Table X2 |
| | Block Index | 16 | Block index of the current ranging block |
| 1150 | Round Index | 16 | Round index of the current ranging round |
| | TX Timestamp | 64 | Transmission timestamp (in units of 15.65 ps) in the common time base |
| 1160 | Ranging Device Management List | 0/24*N | N Ranging Device Management List Elements as defined in Table X3 |
| | CFO | 0/16 | Clock frequency offset with respect to Initiator (in the unit of ppm) |
| | Reply Time List | 0/48*N | M Reply Time List Elements. |
| | Responder Reply Time | 0/32 | Reply time of responder in the common time base |
| | Inter-cluster synchronization | 0/40 | Parameters used for multi-hop time synchronization in multi-cluster scenarios as defined in Table X5 |
| | Anchor Location | 0/152 | The geo-location information of Anchor as defined in Table X6 |
| | Vendor-specific Data | variable | Any vendor-specific data |
| 1170 | Configure Parameter | N | Parameter for Configuration. |

| Parameter | Size (bits) | Notes |
|---|---|---|
| Ranging Device Management List Length | 4 | Number of elements in the ranging device management list field |
| Reply Time List Length | 4 | Number of elements in the Reply Time List field |
| CFO Present | 1 | Presence of CFO<br>0: CFO not present<br>1: CFO is present |
| Cost Metric Present | 1 | 0: Cost Metric not present<br>1: Cost Metric is present<br>If cost metric is present, routing sequence number should be present. |
| Inter-Cluster Synchronization | 1 | 0: Inter-Cluster synchronization is not present<br>1: Inter-Cluster synchronization is present |
| Anchor Location present | 1 | 0: Anchor Location field is not present<br>1: Anchor Location field is present |
| Vendor-specific data present | 1 | 0: Vendor-specific data field is not present<br>1: Vendor-specific data field is present |
| Configure Parameter Present bit | 1 | 0: Configure Parameter is not present<br>1: Configure Parameter is present |

| | Parameter | Size (bits) | Notes |
|---|---|---|---|
| 1110c | Vendor OUI | 24 | 0x5A18FF |
| 1120c | UWB Message ID | 4 | 0x08 = Data Message |
| 1130c | Data Transfer Content Type | 4 | 0x0: Application Payload<br>0x1: Data Transfer Phase Control Message<br>0x2 - 0xF: RFU |
| 1140c | Content | Variable | Application payload if Data Transfer Content Type == 0x0<br>Data Transfer Phase Control Message if Data Transfer Content Type == 0x1 |

| | Parameter | Size (bits) | Notes |
|---|---|---|---|
| 1110d | Vendor OUI | 24 | 0x5A18FF |
| | UWB Message ID | 4 | 0x07 = OWR Message |
| | OWR Message Type | 4 | 0x0: UL-TDoA Blink message<br>0x1: UL-TDoA Synchronization message<br>0x2: Poll DL-TDoA Message<br>0x3: Response DL-TDoA Message<br>0x4: Final DL-TDoA Message<br>0x5: AoA Measurement message<br>0x6-0xF: RFU |
| | Message Control | 16 | Configuration of the message as defined in Table X2 |
| | Block Index | 16 | Block index of the current ranging block |
| | Round Index | 16 | Round index of the current ranging round |
| | TX Timestamp | 64 | Transmission timestamp (in units of 15.65 ps) in the common time base |
| | Ranging Device Management List | 0/24*N | N Ranging Device Management List Elements as defined in Table X3 |
| | CFO | 0/16 | Clock frequency offset with respect to Initiator (in the unit of ppm) |
| | Reply Time List | 0/48*N | M Reply Time List Elements. |
| | Responder Reply Time | 0/32 | Reply time of responder in the common time base |
| | Inter-cluster synchronization | 0/40 | Parameters used for multi-hop time synchronization in multi-cluster scenarios as defined in Table X5 |
| | Anchor Location | 0/152 | The geo-location information of Anchor as defined in Table X6 |
| | Payload termination IE | | |
| 1120d | Vendor OUI | 24 | 0x5A18FF |
| | UWB Message ID | 4 | 0x08 = Data Message |
| | Data Transfer Content Type | 4 | 0x0: Application Payload<br>0x1: Data Transfer Phase Control Message<br>0x2 - 0xF: RFU |
| | Content length | 16 | length of Configure Parameter field |
| | Configure Parameter | N*8 | Configuration |
| | Payload termination IE | | |

FIG. 11D

| Parameter | Size (bits) | Notes |
|---|---|---|
| Vendor OUI | 24 | 0x5A18FF |
| UWB Message ID | 4 | 0x07 = OWR Message |
| OWR Message Type | 4 | 0x0: Blink UTM<br>0x1: Synchronization UTM<br>0x2: Poll DTM<br>0x3: Response DTM<br>0x4: Final DTM<br>0x5: AoA Advertisement<br>0x6-0xF: RFU(Ready For Use)<br>→0x6 : Management |
| Management Message Type | 2 | 0x0 : Configuration<br>0x1 : Stop<br>0x2 : Ack<br>0x3 : Restart |
| Configure Parameter | Variable | Parameter for Configuration. |

| Parameter | Size (bits) | Notes |
|---|---|---|
| Round index | 8 | Round index of ranging round list |
| Initiator Address | 16 | Initiator index of current ranging round |
| Responder DT-Anchor Management List | (0/24/32/40/72/80/88)*N | N Responder DT-Anchor Management List Elements as defined in Table X3. N is determined by the value of the Responder DT-Anchor Management List Length field in the Message Control field. Each Responder DT-Anchor Management List Element shall contain the Address field and may contain the Ranging Slot index field and the ToF Result field. |

METHOD AND DEVICE FOR UWB COMMUNICATION

CROSS-REFERENCE TO RELATED APPLICATION(S)

This application is based on and claims priority under 35 U.S.C. § 119 to Korean Patent Application No. 10-2021-0145044, filed in the Korean Intellectual Property Office on Oct. 27, 2021, the entire disclosure of which is incorporated herein by reference.

BACKGROUND

1. Field

The disclosure generally relates to ultra-wide band (UWB) communication and, more specifically, to a method and device for resetting the configuration of a downlink time difference of arrival (DL-TDoA).

2. Description of Related Art

The Internet is evolving from the human-centered connection network by which humans create and consume information to the Internet of things (IoT) network by which information is communicated and processed between things or other distributed components. Another arising technology is the Internet of everything (IoE), which is a combination of the big data processing technology and the IoT technology through, e.g., a connection with a cloud server. Implementing the IoT requires technical elements, such as sensing technology, a wired/wireless communication and network infrastructure, service interface and security technologies. A recent, ongoing research for thing-to-thing connection is on techniques for sensor networking, machine-to-machine (M2M), or machine-type communication (MTC).

In the IoT environment may be offered intelligent Internet technology services that collect and analyze the data generated by the things connected with one another to create human life a new value. The IoT may have various applications, such as smart home, smart building, smart city, smart car or connected car, smart grid, healthcare, or smart appliance industry, or state-of-art medical services, through conversion or integration of conventional information technology (IT) techniques and various industries.

As wireless communication systems evolve to provide various services, a need arises for a method for effectively providing such services. For example, it is possible to use a ranging technique for measuring the distance between electronic devices using UWB. UWB is a wireless communication technology that uses a very wide frequency band of several GHz or more in a baseband without using a wireless carrier.

SUMMARY

The disclosure has been made to address at least the above-mentioned problems and/or disadvantages and to provide at least the advantages described below, by providing a structure, method, and device of a UWB message/packet for resetting the configuration for DL-TDoA.

According to an aspect, a method performed by a first UWB device is provided that includes generating a UWB message related to a configuration of a multi-cluster and transmitting the UWB message, with the UWB message including UWB message identifier (ID) information set to a value indicating that the UWB message is a one-way ranging (OWR) message and OWR message type information set to a value indicating that a type of the OWR message is a management message.

According to another aspect, a method performed by a second UWB device is provided that includes receiving a UWB message related to a configuration of a multi-cluster from a first UWB device and applying the configuration of the multi-cluster based on the UWB message, with wherein the UWB message including UWB message ID information set to a value indicating that the UWB message is an OWR message and OWR message type information set to a value indicating that a type of the OWR message is a management message.

According to a further aspect, a first UWB device is provided that includes a transceiver and at least one processor that is configured to generate a UWB message related to a configuration of a multi-cluster and transmit the UWB message, with the UWB message including UWB message ID information set to a value indicating that the UWB message is an OWR message and OWR message type information set to a value indicating that a type of the OWR message is a management message.

According to another aspect, a second UWB device is provided that includes a transceiver and at least one processor that is configured to receive a UWB message related to a configuration of a multi-cluster from a first UWB device and apply the configuration of the multi-cluster based on the UWB message, with the UWB message including UWB message ID information set to a value indicating that the UWB message is an OWR message and OWR message type information set to a value indicating that a type of the OWR message is a management message.

The present disclosure may be modified to change the configuration of a cluster or multi-cluster for DL-TDoA through the method and device of the disclosure.

BRIEF DESCRIPTION OF DRAWINGS

The above and other aspects, features, and advantages of certain embodiments will be more apparent from the following detailed description taken in conjunction with the accompanying drawings, in which:

FIG. 9A illustrates a downlink TDoA message according to an embodiment;

FIG. 9B illustrates a runtime configuration message according to a 1-1st embodiment;

FIG. 9C illustrates a runtime configuration message according to a 1-2nd embodiment;

FIG. 9D illustrates a message control field included in a runtime configuration message according to the 1-1st embodiment or the 1-2nd embodiment;

FIG. 10A illustrates a runtime configuration message according to a second embodiment;

FIG. 10B illustrates a message control field included in a runtime configuration message according to the second embodiment;

FIG. 11A illustrates a runtime configuration message according to a third embodiment;

FIG. 11B illustrates a message control field included in a runtime configuration message according to the third embodiment;

FIG. 11C illustrates a data transfer information element (IE) message including a runtime configuration parameter according to an embodiment;

FIG. 11D illustrates an example of a runtime configuration message including a plurality of payload IEs according to an embodiment;

FIG. 11E illustrates another example of a runtime configuration message according to the third embodiment;

FIG. 11F illustrates another example of a configure parameter field included in a runtime configuration message according to the third embodiment;

DETAILED DESCRIPTION

Figure 1:
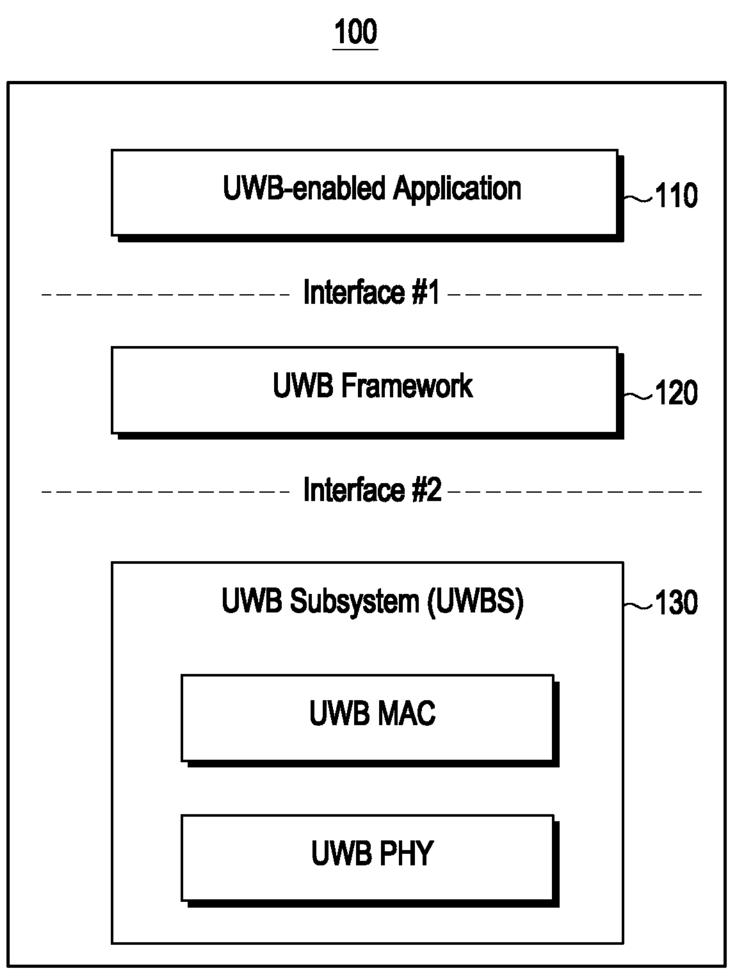
FIG. 1 illustrates an architecture of a UWB device according to an embodiment.

Hereinafter, embodiments are described in detail with reference to the accompanying drawings.

In describing embodiments, the description of technologies that are known in the art and are not directly related to the disclosure is omitted to avoid making the gist of the disclosure unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the present disclosure.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term unit means a software element or a hardware element such as a field-programmable gate array (FPGA) or an application specific integrated circuit (ASIC). A unit plays a certain role. However, the term unit is not limited as meaning a software or hardware element. A unit may be configured in a storage medium that may be addressed or may be configured to reproduce one or more processors. Accordingly, as an example, a unit includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. Further, an element or a 'unit' may be implemented to reproduce one or more central processing units (CPUs) in a device or a security multimedia card. According to embodiments, a . . . unit may include one or more processors.

As used herein, the term terminal or the term device may also be referred to as a mobile station (MS), user equipment (UE), user terminal (UT), terminal, wireless terminal, access terminal (AT), subscriber unit, subscriber station (SS), wireless device, wireless communication device, wireless transmit/receive unit (WTRU), mobile node, or mobile or may be referred to in other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include an M2M terminal and an MTC terminal/device, but is not limited thereto. In the disclosure, the terminal may be referred to as an electronic device or simply as a device.

Although a communication system using UWB is described in connection with the embodiments, as an example, embodiments may also apply to other communication systems with similar technical background or features. For example, a communication system using Bluetooth™ or ZigBee™ may be included therein. Further, embodiments may be modified in such a range as not to significantly depart from the scope of the disclosure under the determination by one of ordinary skill in the art and such modifications may be applicable to other communication systems.

In general, wireless sensor network technology is largely divided into a wireless local area network (WLAN) technology and a wireless personal area network (WPAN) technology according to the recognition distance. In this case, WLAN is a technology based on IEEE 802.11 which enables access to the backbone network within a radius of about 100 meters. WPAN is a technology based on IEEE 802.15 which includes Bluetooth™, ZigBee™, and UWB. A wireless network in which such a wireless network technology is implemented may include a plurality of electronic devices.

UWB refers to a short-range high-rate wireless communication technology using a wide frequency band of several GHz or more, low spectral density, and short pulse width (e.g., 1 nsec to 4 nsec) in a baseband state. UWB may mean a band itself to which UWB communication is applied. UWB enables secure and accurate ranging between devices. Thus, UWB enables relative position estimation based on the distance between two devices or accurate position estimation of a device based on the distance from fixed devices having known positions.

The terminology used herein is provided for a better understanding of the disclosure, and changes may be made thereto without departing from the technical spirit of the disclosure.

Application dedicated file (ADF) is, e.g., a data structure in an application data structure that may host an application or application specific data.

Application protocol data unit (APDU) is "a command and a response used when communicating with the application data structure in the UWB device.

Application specific data is, e.g., a file structure having a root level and an application level including UWB controllee information and UWB session data required for a UWB session.

Controller is a ranging device that controls ranging control messages (RCM) or control messages.

Controllee is a ranging device using a ranging parameter in the RCM (or control message) received from the controller.

Unlike static STS, dynamic scrambled timestamp sequence (STS) mode is an operation mode in which the STS is not repeated during a ranging session. In this mode, the STS may be managed by the ranging device, and the ranging session key that generates STS may be managed by a secure component.

Applet is, e.g., an applet executed on the secure component including UWB parameters and service data. In this disclosure, Applet may be an FiRa Applet defined by FiRa.

Ranging device is a device capable of performing UWB ranging. In the disclosure, the ranging device may be an enhanced ranging device (ERDEV) defined in IEEE 802.15.4z or an FiRa Device defined by FiRa. The ranging device ranging device may be referred to as a UWB device.

UWB-enabled Application is an application for UWB service. For example, the UWB-enabled Application may be an application using a framework API for configuring an out-of-band (OOB) connector, a secure service, and/or a UWB service for a UWB session. The UWB-enabled Application may be abbreviated as an application or a UWB application, and the UWB-enabled Application may be an FiRa-enabled Application defined by FiRa.

Framework is a component that provides access to profiles, individual-UWB configuration and/or notifications. Framework may be, e.g., a collection of logical software components including profile manager, an OOB connector, secure service, and/or UWB service. The Framework may be an FiRa Framework defined by FiRa.

OOB Connector is a software component for establishing an OOB connection (e.g., BLE connection) between ranging devices. The OOB Connector may be an FiRa OOB Connector defined by FiRa.

Profile may be a previously defined set of UWB and OOB configuration parameters, and profile may be an FiRa Profile defined by FiRa.

Profile manager is a software component that implements a profile available on the ranging device, and the profile manager may be an FiRa Profile Manager defined by FiRa.

Service may be an implementation of a use case that provides a service to an end-user.

Smart ranging device is a ranging device that may implement an optional Framework API. The smart ranging device may be an FiRa Smart Device defined by FiRa.

Global dedicated file (GDF) is a root level of application specific data including data required to establish a USB session.

Framework API is an API used by a UWB-enabled Application to communicate with the Framework.

Initiator may be a ranging device that initiates a ranging exchange.

Object identifier (OID) is an identifier of the ADF in the application data structure.

An OOB connection is data communication that does not use UWB as an underlying wireless technology.

Ranging data set (RDS) is data (e.g., UWB session key, session ID, etc.) required to establish a UWB session when it is needed to protect confidentiality, authenticity and integrity.

Responder is a ranging device that responds to the initiator in a ranging exchange.

STS may be a ciphered sequence for increasing the integrity and accuracy of ranging measurement timestamps. The STS may be generated from the ranging session key.

Secure channel is a data channel that prevents overhearing and tampering.

Secure component is an entity (e.g., a secure element (SE) or a trusted execution environment (TEE)) having a defined security level that interfaces with UWBS for the purpose of providing RDS to UWBS, e.g., when dynamic STS is used.

SE is a tamper-resistant secure hardware component that may be used as a Secure Component in the Ranging Device.

Secure ranging is ranging based on STS generated through a strong encryption operation.

Secure Service is a software component for interfacing with a secure component, such as an SE or a TEE.

Service applet may be an applet on a secure component that handles service specific transactions.

Service data is data defined by a service provider to be transferred between two ranging devices to implement a service.

Service provider is an entity that defines and provides hardware and software required to provide a specific service to an end-user.

Static STS mode is an operation mode in which STS is repeated during a session, and does not need to be managed by the Secure Component.

Secure UWB Service (SUS) Applet is an applet on the SE that communicates with the applet to retrieve data needed to enable secure UWB sessions with other ranging devices. The SUS Applet may transfer corresponding data (information) to the UWBS.

UWB Service is a software component that provides access to the UWBS.

UWB Session is a period from when the controller and the controllee start communication through UWB until the communication stops. A UWB Session may include ranging, data transfer, or both ranging and data transfer.

UWB Session ID is an ID (e.g., a 32-bit integer) that identifies the UWB Session, shared between the controller and the controller.

UWB session key is a key used to protect the UWB Session. The UWB Session Key may be used to generate the STS. In this disclosure, the UWB session key may be a UWB ranging session key (URSK), and may be abbreviated as a session key.

UWB subsystem (UWBS) is a hardware component implementing the UWB physical (PHY) and medium access control (MAC) layers specifications. UWBS may have an interface to Framework and an interface to Secure Component to search for RDS. In this disclosure, the UWB PHY and MAC specifications may be, e.g., FiRa PHY and FiRa MAC specifications defined by FiRa referring to IEEE 802.15.4/4z.

A DL-TDoA anchor may be a UWB device (e.g., an FiRa device) that exchanges a DT message (downlink TDoA message (DTM) with another DT-anchor. For example, the DT-anchor may be a UWB device installed by a service provider on a wall, ceiling, structure, or the like in a room to provide an indoor positioning service. The DT-anchor may be of two types: an initiator DT-anchor and a responder DT-anchor. Herein, the DT-anchor may be referred to as an anchor device, a UWB anchor, or an UWB anchor device.

Initiator DT-anchor may be a DT-anchor that transmits a poll DTM to the responder DT-anchor. The initiator DT-anchor may initiate a ranging round for DL-TDoA (DL-TDoA ranging round). Herein, the initiator DT-anchor may be referred to as an initiator anchor, an initiator anchor device, an initiator UWB anchor, or an initiator UWB anchor device.

The initiator DT-anchor may schedule a ranging slot for the responder DT-anchors operating in the same ranging round to respond. For example, the initiator DT-anchor may schedule the transmission times of the associated responder DT-anchors (e.g., responder DT-anchors in the same cluster). The poll DTM of the initiator DT-anchor may include the transmission timestamp of the poll DTM. Herein, the poll DTM may be referred to as a poll message, an initiation message, or an initiator DTM.

The initiator DT-anchor may further transfer a final DTM after receiving the responses of the responder DT-anchors. For example, the initiator DT-anchor may additionally transmit a final DTM after all the responder DT-anchors in the same cluster transmit the response DTM in the DL-TDoA ranging round. The final DTM may include a reply time for the message sent by the responder DT-anchors and/or the transmission timestamp of the final DTM. Herein, the final DTM may be referred to as a final message.

Responder DT-anchor is a DT-anchor that responds to the poll DTM to the initiator DT-anchor. The response DTM to which the responder DT-anchor responds may include the response time for the poll DTM and/or the transmission timestamp of the response message. The ranging slot for the response DTM may be scheduled by the initiator DT-anchor, or may be preset. Herein, the responder DT-anchor may be referred to as a responder anchor, a responder anchor device, a responder UWB anchor, or a responder UWB anchor device. In the disclosure, the responder DTM may be referred to as a response message, a responder message, or a response DTM.

DT-tag may be a UWB device (e.g., an FiRa device) that may estimate its location (e.g., coordinates) using the TDoA measurement based on the DTM exchanged between DT-anchors. In the disclosure, the DT-tag may be referred to as a tag, a tag device, a UWB tag, or a UWB tag device.

DL-TDoA (DT) is a localization method using TDoA measurement from a plurality of DT-anchors. The DT-anchors may exchange DTMs with each other, and the DT-tag may passively receive the DTM. Each DT-tag receiving DTMs may calculate the TDoA using at least one of the reception timestamp of each DTM, the transmission timestamp of DTMs included in the corresponding DTMs, or the reply time included in the DTMs. The DT-tag may estimate its location based on at least one of the calculated coordinates of TDoA and DT-anchors.

Cluster is a set of DT-anchors that transmit and receive the DTM, such that the DT-tag may estimate its location. The cluster may include one initiator DT-anchor and one or more responder DT-anchors. The cluster may include a different number of responder DT-anchors depending on the positioning scheme (e.g., 2D positioning, 3D positioning). The cluster area may be a space formed by the DT anchors constituting the cluster. A plurality of clusters may be deployed in a wide range of service area. The area covered by one cluster may overlap the area covered by an adjacent cluster. In this disclosure, a cluster may be referred to as a cell.

Payload IE may be referred to as a payload IE and may be included in the MAC payload of the UWB MAC frame defined in IEEE 802.15.4/4z. The MAC payload may include a plurality of payload IEs. Further, the DTM may be a UWB message including the DTM payload IE.

Data transfer IE may be an additional payload IE for transmitting application data. Application data may be data transferred from a framework or application above the UWB MAC Layer. The data transfer IE may be used in the procedure for ranging between the initiator device and the responder device. In this case, the UWB message may include at least one or both of the payload IE for ranging and the data transfer IE for application data transfer. For example, the data transfer IE may be included and transmitted as part of the payload IE of the MAC payload of a ranging initiation message (RIM) for ranging, a ranging response message (RRM), a ranging final message (RFM), a measurement report message (MRM) and ranging result report message (RRRM). The data transfer IE may be transferred to the payload IE of the MAC payload of the DTM. For example, the data transfer IE may be transferred, together with the DTM payload IE, while being attached to the MAC payload portion of the poll DTM, response DTM, and final DTM.

Reference clock refers to one common clock that allows the DT-anchors and DT-tags constituting the downlink TDoA system to operate in sync with each other and allows the DT-tag to obtain a correct TDoA value. Since DT-anchors and DT-tags are different terminals and operate with different crystal oscillators, there may be a slight difference in clock speed and, since the power supply time differs, the clock origin may be different. Therefore, a mechanism to maintain the same clock throughout the system is required, which may be called time synchronization. Time synchronization between the components in the cluster may be referred to as intra-cluster synchronization. The operation in which the plurality of responder anchors constituting one cluster sync with the clock of the initiator anchor of the same cluster may be referred to as intra-cluster synchronization. Synchronizing between adjacent clusters may be referred to as inter-cluster synchronization, and maintaining the same ranging block structure between the initiator anchors of the adjacent clusters may also be referred to as inter-cluster synchronization. In the cluster, the clock of the initiator anchor may be a reference clock and, in the entire system, the clock of one specific initiator anchor may be a reference clock.

The global controller may be a UWB terminal that may set the order of operation of the DT-anchors constituting the downlink TDoA system, the structure of the cluster, and the reference clock. The global controller may be one of the DT-anchors, and there may be a plurality of global controllers in the same system. The global controller may be a terminal that sends a management message including, e.g., a runtime configuration message, to change the cluster structure in the multi-cluster structure.

When determined to make the subject matter unclear, the detailed description of the known art or functions may be skipped.

Hereinafter, various embodiments are described with reference to the accompanying drawings.

FIG. 1 illustrates an architecture of a UWB device according to an embodiment.

The UWB device 100 may be an electronic device supporting UWB communication. The UWB device 100 may be, e.g., a ranging device supporting UWB ranging. The ranging device may be an ERDEV defined in IEEE 802.15.4z or an FiRa device defined by FiRa.

In FIG. 1, the UWB device 100 may interact with other UWB devices through a UWB session.

The UWB device 100 may implement a first interface (Interface #1) that is an interface between the UWB-enabled Application 110 and the framework 120, and the first interface allows the UWB-enabled application 110 on the UWB device 100 to use the UWB capabilities of the UWB device 100 in a predetermined manner. The first interface may be a framework API or a proprietary interface, but is not limited thereto.

The UWB device 100 may implement a second interface (Interface #2) that is an interface between the UWB framework 120 and UWBS 130. The second interface may be a UWB command interface (UCI) or proprietary interface, but is not limited thereto.

Referring to FIG. 1, the UWB device 100 may include a UWB-enabled Application 110, a framework (UWB Framework) 120, and/or a UWBS 130 including a UWB MAC Layer and a UWB physical layer. Depending on the embodiment, some entities may not be included in the UWB device, or additional entities (e.g., security layer) may be further included.

The UWB-enabled Application 110 may trigger establishment of a UWB session by a UWBS 130 through the first interface. The UWB-enabled Application 110 may use one of previously defined profiles (profile). For example, the UWB-enabled Application 110 may use one of the profiles defined in FiRa or a custom profile. The UWB-enabled Application 110 may use the first interface to handle related events, such as service discovery, ranging notifications, and/or error conditions.

The framework 120 may provide access to profiles, individual-UWB configuration and/or notifications. The framework 120 may support at least one of a function for UWB ranging and transaction execution, a function to provide an interface to the application and UWBS 130, or a function to estimate the location of the device 100. The framework 120 may be a set of software components. As described above, the UWB-enabled Application 110 may interface with the framework 120 through the first interface, and the framework 120 may interface with the UWBS 130 through the second interface.

Meanwhile, the UWB-enabled Application 110 and/or framework 120 may be implemented by an application processor (AP) (or processor). Accordingly, the operation of the UWB-enabled Application 110 and/or the framework 120 may be understood as performed by an AP. Herein, the framework may be referred to as an AP or a processor.

The UWBS 130 may be a hardware component including a UWB MAC Layer and a UWB physical layer. The UWBS 130 may perform UWB session management and may communicate with the UWBS of another UWB device. The UWBS 130 may interface with the framework 120 through the second interface and may obtain the security data from the Secure Component. The framework (or application processor) 120 may transmit a command to the UWBS 130 through UCI, and the UWBS 130 may transmit a response to the command to the framework 120. The UWBS 130 may transfer a notification to the framework 120 through the UCI.

Figure 2:
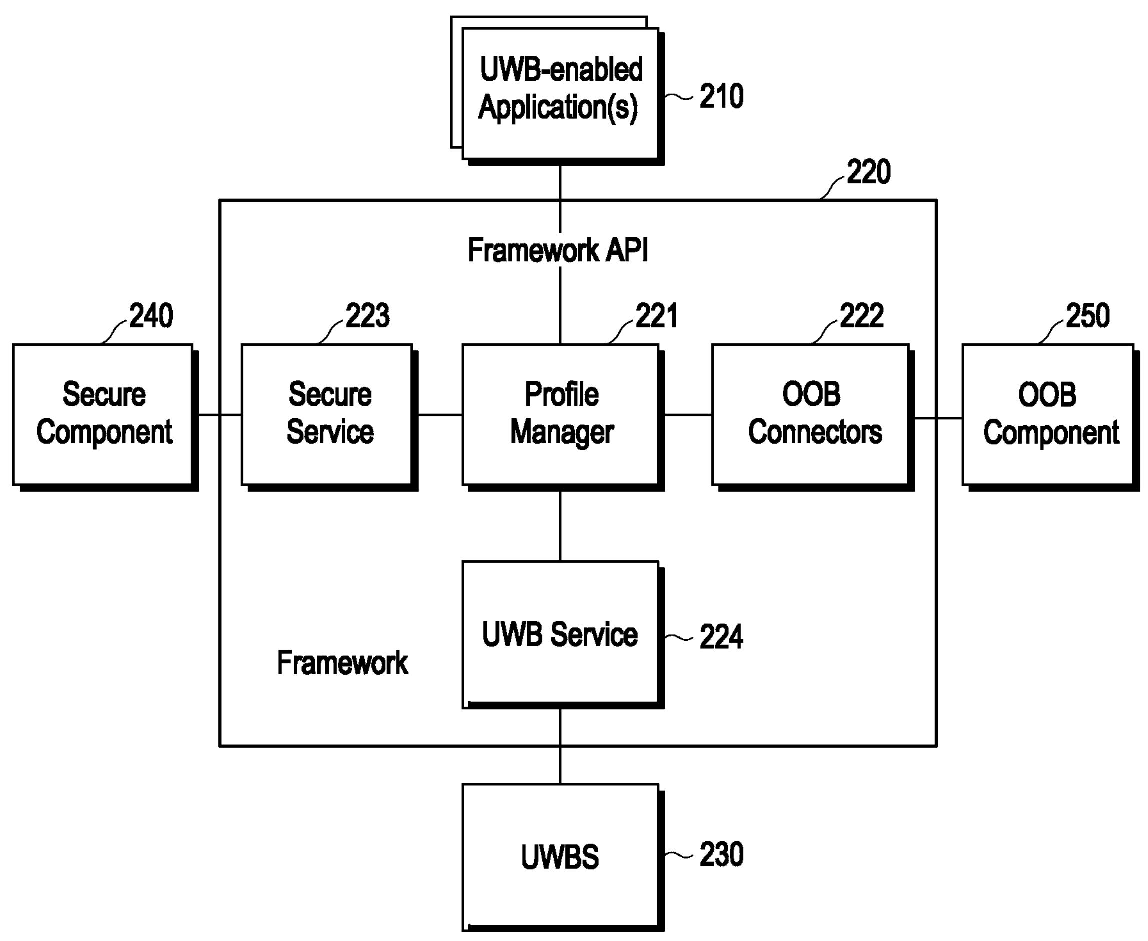
FIG. 2 illustrates a configuration of a framework of a UWB device according to an embodiment.

FIG. 2 illustrates a configuration of a framework of a UWB device according to an embodiment.

The UWB device of FIG. 2 may be an example of the UWB device 100 of FIG. 1.

Referring to FIG. 2, the framework 220 may include, e.g., software components, such as Profile Manager 221, OOB Connector(s) 222, Secure Service 223 and/or UWB service 224.

The Profile Manager 221 may serve to manage profiles available on the UWB device. The profile may be a set of parameters required to establish communication between UWB devices. For example, a profile may include a parameter indicating which OOB secure channel is used, a UWB/

OOB configuration parameter, a parameter indicating whether the use of a particular secure component is mandatory, and/or a parameter related to the file structure of the ADF. The UWB-enabled application 210 may communicate with the Profile Manager 221 through the first interface (e.g., framework (API)).

The OOB Connector 222 may serve to establish an OOB connection with another device. The OOB Connector 222 may handle an OOB step including a discovery step and/or a connection step. The OOB component (e.g., BLE component) 250 may be connected to the OOB connector 222.

The Secure Service 223 may play a role of interfacing with a Secure Component 240, such as an SE or a TEE.

The UWB Service 224 may perform a role of managing the UWBS 230. The UWB Service 224 may provide access to the UWBS 230 from the Profile Manager 221 by implementing the second interface.

Figure 3:
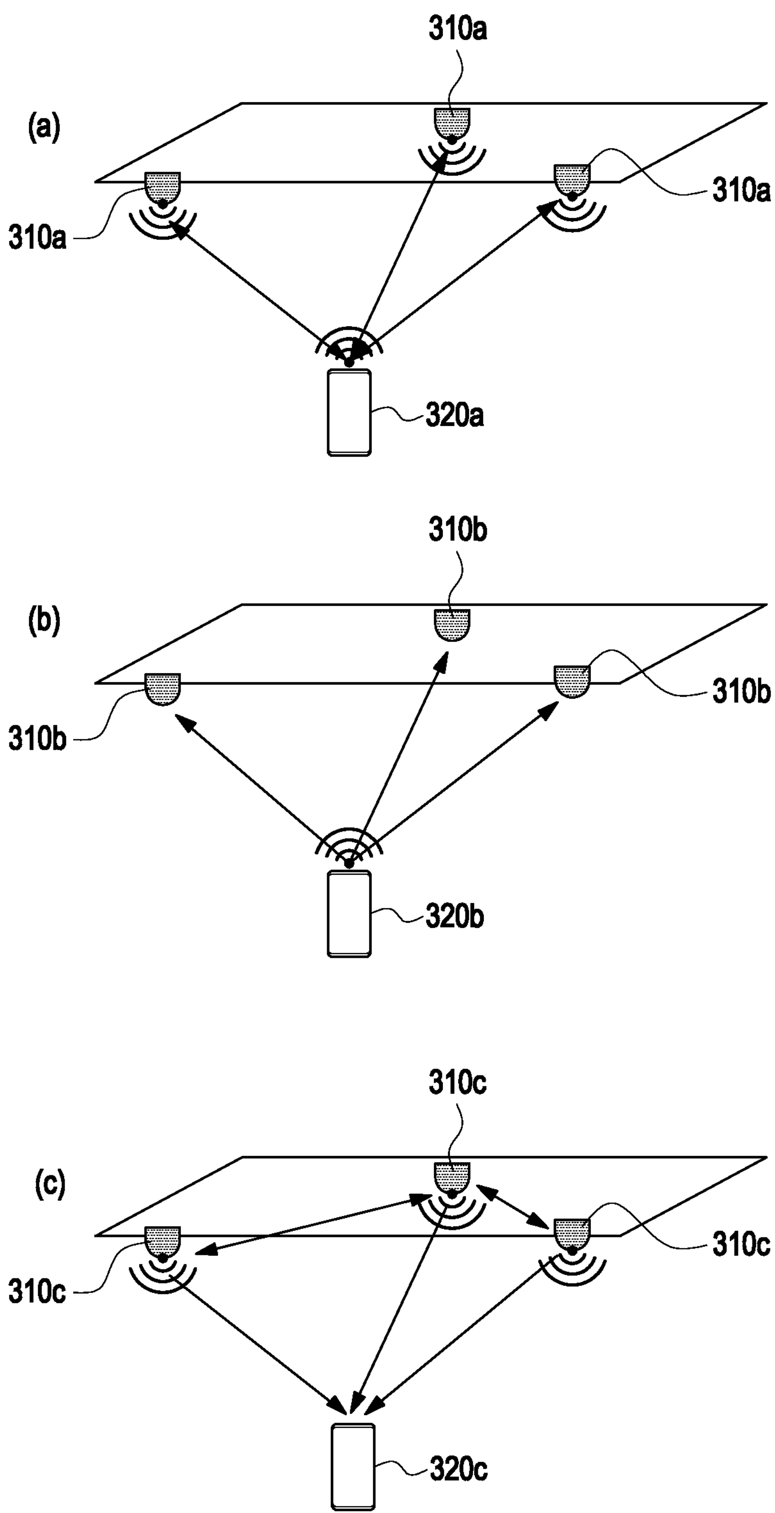
FIG. 3 illustrates various examples of a UWB ranging method according to an embodiment.

FIG. 3 illustrates various examples of a UWB ranging method according to an embodiment.

Part (a) of FIG. 3 illustrates an example of a two-way ranging (TWR) scheme. Part (b) of FIG. 3 illustrates an example of an uplink time difference of arrival (TDoA) scheme that is one of one way ranging (OWR) schemes. Part (c) of FIG. 3 illustrates an example of a downlink TdoA scheme (OWR), which is another one of OWR schemes.

The TWR scheme corresponds to a method in which the UWB devices exchange ranging messages therebetween to calculate the time of flight (ToF) and determine the location of the UWB device based thereon. The uplink TdoA method is a method in which TdoA anchors receive the ranging message transmitted from the UWB device (tag), calculate the time difference (e.g., TdoA) and, based thereupon, determine the location of the UWB device and corresponds to one of OWR schemes. The downlink TdoA method is a method in which the UWB device (UWB tag) receives the ranging messages transmitted from the UWB anchors, calculates the time difference (e.g., TdoA) and, based thereupon, determines the location of the UWB device and corresponds to one of the OWR schemes.

Referring to part (a) of FIG. 3, the user's UWB device 320*a* may perform ranging through a ranging exchange using at least one UWB anchor 310*a* and a plurality of ranging messages. The TWR scheme of FIG. 3(*a*) may follow the scheme (e.g., DS-TWR scheme or SS-TWR scheme) defined in IEEE 802.15.4/4z. As shown in part (a) of FIG. 3, the TWR may be easily installed because synchronization or networking is not required between UWB anchors, but has a disadvantage in that the number of users (UEs) is limited.

Referring to part (b) of FIG. 3, the user's UWB device 320*b* may transmit (broadcast) ranging messages (OWR messages) to at least one UWB anchor 310*b*, and at least one UWB anchor 310*b* may identify the location of the UWB device 320*b* based on the time difference (e.g., TdoA) when the ranging messages are received.

The uplink TdoA (OWR) as shown in part (b) of FIG. 3 has the advantage of reducing power consumption in the UE, but has disadvantages, such as difficulty in installation due to the need for synchronization or networking between UWB anchors, privacy issues arising as the system operator is aware of the locations of all the users, and limit to the number of users (UEs).

Referring to part (c) of FIG. 3, the user's UWB device 320*c* may receive (e.g., sniff or overhear) the ranging messages (OWR messages) that at least one UWB anchor 310*c* transmits/receives therebetween and identify its location. For example, the UWB device 320*c*, which is a UWB tag, may receive the DTM exchanged between the UWB anchors 310*c*. In this case, the DTM exchange between the UWB anchors 310*c* may follow the DS-TWR scheme or the SS-TWR scheme.

The downlink TDoA (OWR) as shown in part (c) of FIG. 3 has such advantages as no limit to the number of UEs (scalability), no privacy issues unlike in Uplink TDoA, no need for synchronization or networking between UWB anchors and ease to install, possibility of the UD itself to calculate its location, and possibility of enhanced positioning using additional data, e.g., sensor data from the UE.

Figure 4:
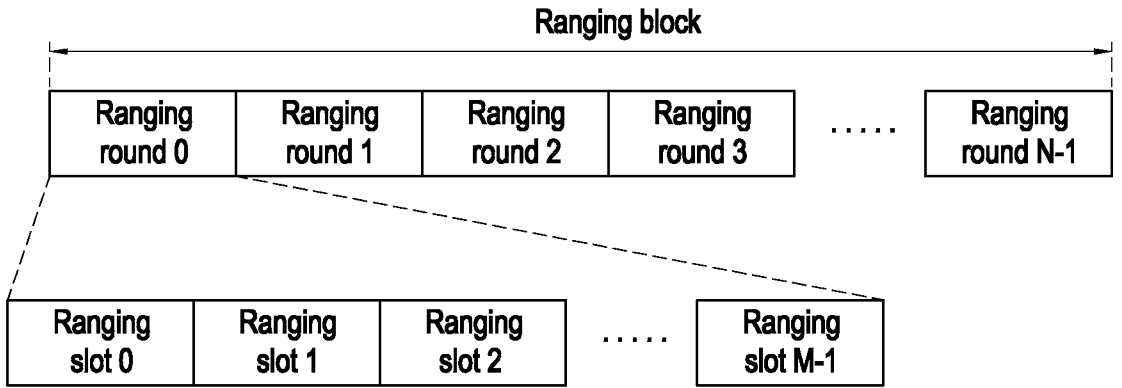
FIG. 4 illustrates a structure of a ranging block and round used for UWB ranging according to an embodiment.

FIG. 4 illustrates a structure of a ranging block and round used for UWB ranging according to an embodiment.

The ranging block refers to a time period for ranging. The ranging round may be a period of sufficient duration to complete one entire range-measurement cycle in which a set of UWB devices participating in a ranging exchange involves. The ranging slot may be a sufficient period for transmission of at least one ranging frame (RFRAME) (e.g., ranging initiation/reply/final message, etc.).

As shown in FIG. 4, one ranging block may include at least one ranging round. Each ranging round may include at least one ranging slot.

When the ranging mode is a block-based mode, a mean time between contiguous ranging rounds may be a constant. Alternatively, when the ranging mode is an interval-based mode, the time between contiguous ranging rounds may be dynamically changed. In other words, the interval-based mode may adopt a time structure having an adaptive spacing.

The number and duration of slots included in the ranging round may be changed between ranging rounds.

One ranging round may be used by one cluster. Alternatively, one ranging round may be used by multiple clusters. In this case, the plurality of clusters may be distant clusters that do not interfere with each other.

One ranging round may include at least one first ranging slot for transmitting an initiation message of the initiator anchor, at least one second ranging slot for transmitting a response message corresponding to the initiation message of each responder anchor, and/or at least one third ranging slot for transmitting an end message of the initiator anchor.

A ranging block, a ranging round, and a ranging slot may be abbreviated as a block, a round, and a slot.

Figure 5A:
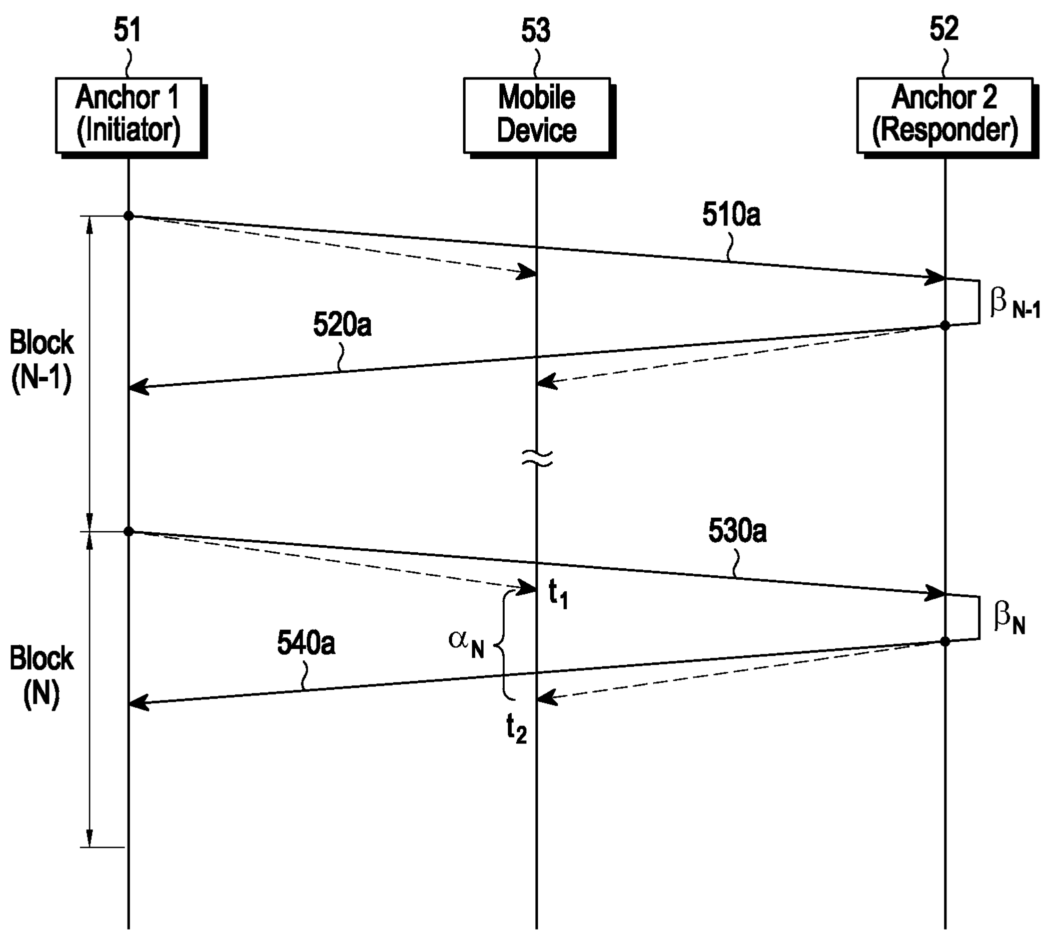
FIG. 5A illustrates a method for performing DL-TDoA according to an embodiment.

FIG. 5A illustrates a method for performing DL-TDoA according to an embodiment.

FIG. 5A corresponds to an embodiment in which DL-TDoA is performed using SS-TWR-based ranging message exchange between one initiator anchor and at least one responder anchor.

In FIG. 5A, anchor 1 51 corresponds to the initiator anchor, and anchor 2 52 corresponds to the responder anchor. The mobile device 53 corresponds to the tag.

Referring to FIG. 5A, operations in the N-1 blocks (or ranging rounds) are described.

In operation 510*a*, the initiator anchor 51 may initiate the DL-TDoA by broadcasting an initiation message based on the scheduling information.

The responder anchor 52 may know whether to transmit a response message and the slot used to transmit the response message by referring to the scheduling information in the initiator DTM.

In operation 520*a*, the responder anchor 52 receiving the initiation message may broadcast a response message based on the scheduling information. $\beta_{N-1}$ denotes the response time taken until the responder anchor 52 receives an initiation message and broadcasts a response message corresponding to the initiation message in the N-1 blocks (or ranging rounds). The response message may include information about the response time $\beta_{N-1}$.

Next, operations in N blocks (or ranging rounds) are described.

In operation 530*a*, the initiator anchor 51 may initiate the DL-TDoA by broadcasting an initiation message based on the scheduling information.

The responder anchor 52 may know whether to transmit a response message and the slot used to transmit the response message by referring to the scheduling information in the initiator DTM.

In operation 540*a*, the responder anchor 52 receiving the initiation message may broadcast a response message based on the scheduling information. $\beta_N$ denotes the response time for the responder anchor 52 to receive an initiation message and broadcast a response message corresponding to the initiation message in the N-1 blocks (or ranging rounds). The response message may include information about the response time $\beta_N$.

Figure 5B:
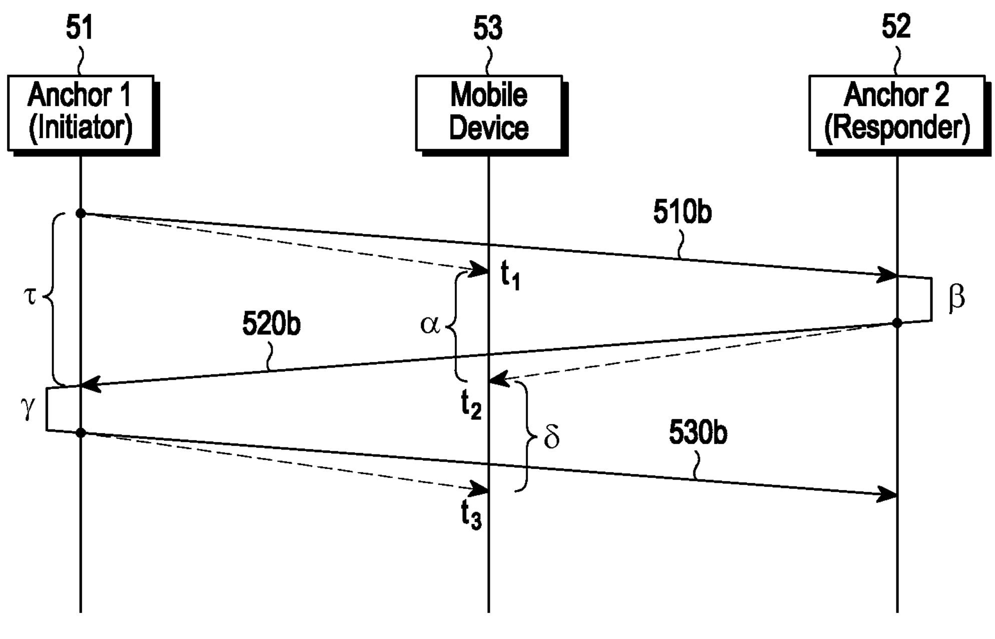
FIG. 5B illustrates a method for performing DL-TDoA according to an embodiment.

As shown in FIG. 5B, the tag 53 may receive (or overhear) an initiation message and a response message in each block being broadcast and may obtain (find out) the TDoA curve. The tag 53 may obtain a TDoA result by repeating the calculation process, as shown in Equation (1), below, on the signals received from, e.g., three or more anchor devices. The tag 53 may obtain relative positions to the anchor devices based on the TDoA result.

The tag 53 may obtain its location (e.g., the location of the tag 53 in the room) from the TDoA result. The tag 53 may identify each anchor device related to the message by the MAC address information included in the message.

A specific calculation process for deriving the difference $d_2-d_1$ between the distance between the initiator anchor 51 and the tag 53 and the distance between the responder anchor 52 and the tag 53, as calculated based on the time values measured by the tag 53, may be provided by Equation (1), below.

$$d_2 - d_1 = \left(\alpha_N * \frac{\beta_{N-1}}{\beta_N} - \beta_N\right) \cdot C \tag{1}$$

Here, $\alpha_N$ denotes the time difference between the time $t_1$ when the initiation message transmitted from the initiator anchor 51 in block N is received by the tag 53 and the time $t_2$ when the response message transmitted from the responder anchor 52 is received by the tag 53. $\beta_{N-1}$ denotes the response time taken until the responder anchor 52 receives an initiation message and broadcasts a response message corresponding to the initiation message in the N-1 blocks (or ranging rounds). $\beta_N$ denotes the response time taken until the responder anchor 52 receives an initiation message and broadcasts a response message corresponding to the initiation message in the N-1 blocks (or ranging rounds). c denotes the speed at which the signal is transmitted.

FIG. 5B illustrates a method for performing DL-TDoA according to an embodiment.

Unlike FIG. 5A, FIG. 5B corresponds to an embodiment in which DL-TDoA is performed using DS-TWR-based ranging message exchange between one initiator anchor and at least one responder anchor.

In FIG. 5B, anchor 1 51 corresponds to the initiator anchor, and anchor 2 52 corresponds to the responder anchor. The mobile device 53 corresponds to the tag.

Referring to FIG. 5B, in operation 510*b*, the initiator anchor 51 may initiate the DL-TDoA by broadcasting an initiation message based on the scheduling information.

The responder anchor 52 may know whether to transmit a response message and the slot used to transmit the response message by referring to the scheduling information in the initiator DTM.

In operation 520*b*, the responder anchor 52 receiving the initiation message may broadcast a response message based on the scheduling information. β denotes the response time taken until the responder anchor 52 receives an initiation message and broadcasts a response message corresponding to the initiation message. The response message may include information about response time β.

In operation 530*b*, the initiator anchor 51 receiving the response message may terminate the DL-TDoA by transmitting an end message. γ denotes the response time required for the initiator anchor 51 to receive the response message and broadcast the end message. The end message may include information about response time γ.

As shown in FIG. 5B, the tag 53 may receive (or overhear) the initiation message, the response message, and end message and may obtain (find out) the TDoA curve. The tag 53 may obtain a TDoA result by repeating the calculation process, as shown in Equation (2), below, on the signals received from, e.g., three or more anchor devices. The tag 53 may obtain relative positions to the anchor devices based on the TDoA result.

The tag 53 may obtain its location (e.g., the location of the tag 53 in the room) from the TDoA result. The tag 53 may identify each anchor device related to the message by the MAC address information included in the message.

A specific calculation process for deriving the difference $d_2-d_1$ between the distance between the initiator anchor 51 and the tag 53 and the distance between the responder anchor 52 and the tag 53, as calculated based on the time values measured by the tag 53, may be provided by Equation (2), below.

$$d_2 - d_1 = \left((\alpha - \delta) * \frac{\tau + \gamma}{\alpha + \delta} - (\beta - \gamma)\right) * C/2 \tag{2}$$

Here, α denotes the time difference between the time $t_1$ when the initiation message transmitted from the initiator anchor 51 is received by the tag 53 and the time $t_2$ when the response message transmitted from the responder anchor 52 is received by the tag 53. δ denotes the time difference between the time $t_2$ when the response message transmitted from the responder anchor 52 is received by the tag 53 and the time $t_3$ when the end message transmitted from the initiation anchor 51 is received by the tag 53. β denotes the response time taken until the responder anchor 52 receives an initiation message and broadcasts a response message corresponding to the initiation message. γ denotes the response time required for the initiator anchor 51 to receive the response message and broadcast the end message. c denotes the speed at which the signal is transmitted.

Figure 6:
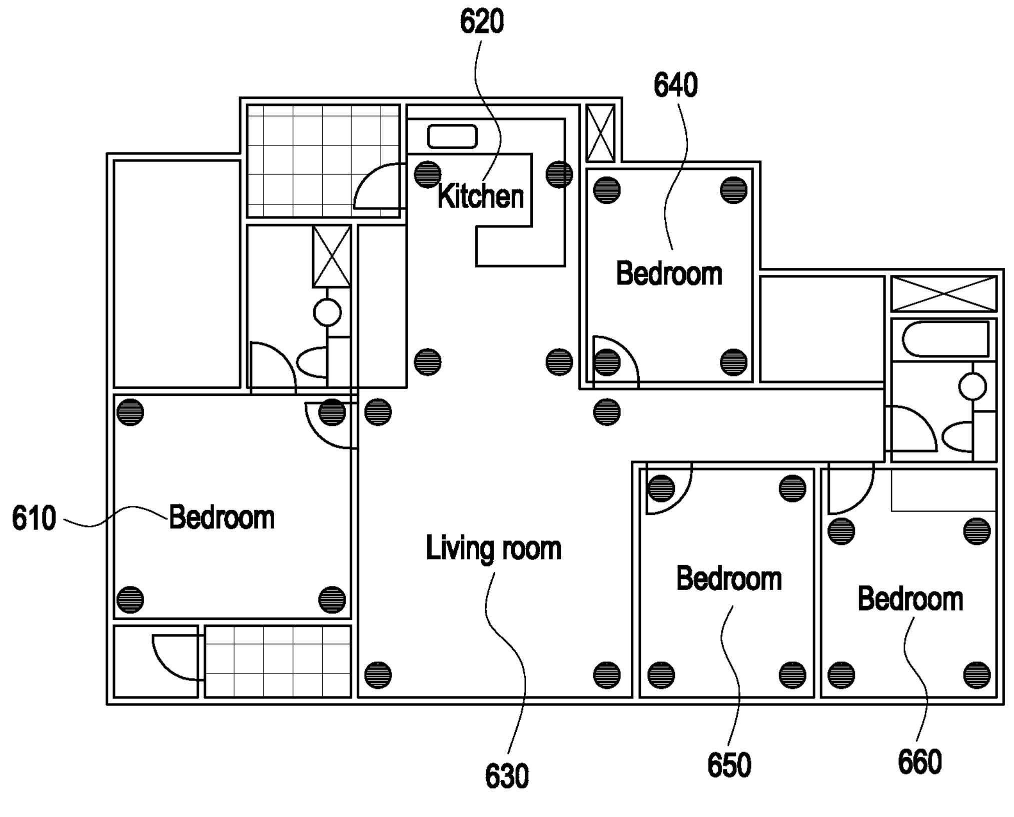
FIG. 6 illustrates a configuration of a multi-cluster according to an embodiment.

FIG. 6 illustrates a configuration of a multi-cluster according to an embodiment.

As described above, a cluster may be a set of anchors including one initiator anchor and one or more responder anchors. The cluster area is a space or communication area formed by the anchors constituting the cluster.

To cover a wide ranging service area, a plurality of clusters (multi-cluster) may be deployed in the service area.

For example, as shown in FIG. 6, a separate cluster 610, 620, 630, 640, 650, and 660 may be deployed in each respective room in a house, thereby covering the entire area of the house.

As an embodiment, a cluster smaller than the cluster for covering a wide area (e.g., free space) may be configured to cover a narrow area (space).

Meanwhile, a dilution of precision occurs in which the error in position estimation increases toward the edge of the cluster. Therefore, it is necessary to arrange the clusters to overlap each other. For example, it is also necessary to configure the areas covered by adjacent clusters to overlap each other or to provisionally configure a large cluster including small clusters.

Such multi-cluster configuring scheme may be, e.g., one of a pre-configuration scheme or a runtime-configuration scheme.

The pre-configuration scheme refers to a scheme in which the service provider or anchor installer directly sets (inputs) the configuration for multi-cluster (e.g., all anchor roles, cluster numbers, and ranging round indexes to be operated) in advance.

The runtime-configuration scheme refers to a scheme that changes the configuration through a configuration message (e.g., a runtime-configuration message) when it is necessary to change the configuration for multi-cluster while providing a service.

For example, when it is difficult to directly input configuration to all the anchors, such as when the anchors and the main controller are not wiredly connected, the configuration need to be changed wirelessly through the runtime-configuration scheme.

Or, e.g., when the configuration needs to be changed due to an issue with some anchors or when a change in the configuration, such as increasing the number of anchors, is required to prevent performance deterioration due to concentration of users in a specific cluster, it may be efficient to wirelessly change the configuration through the runtime-configuration scheme.

As such, in the case of using the runtime-configuration scheme, it is easy to change the configuration so that the convenience of initial installation is increased. Thus, the user experience may be enhanced due to the convenient installation of the multi-cluster in the home and in the business. Further, when the runtime-configuration scheme is used, the convenience of maintenance during operation is also increased. For example, the runtime-configuration scheme may allow for easier replacement of the anchor with an error during operation and adaptive response to a change in the configuration of the cluster due to an external factor (e.g., construction).

Described below are various embodiments for changing configuration for multi-cluster (multi-cluster configuration or runtime configuration) through the runtime-configuration scheme.

Figure 7:
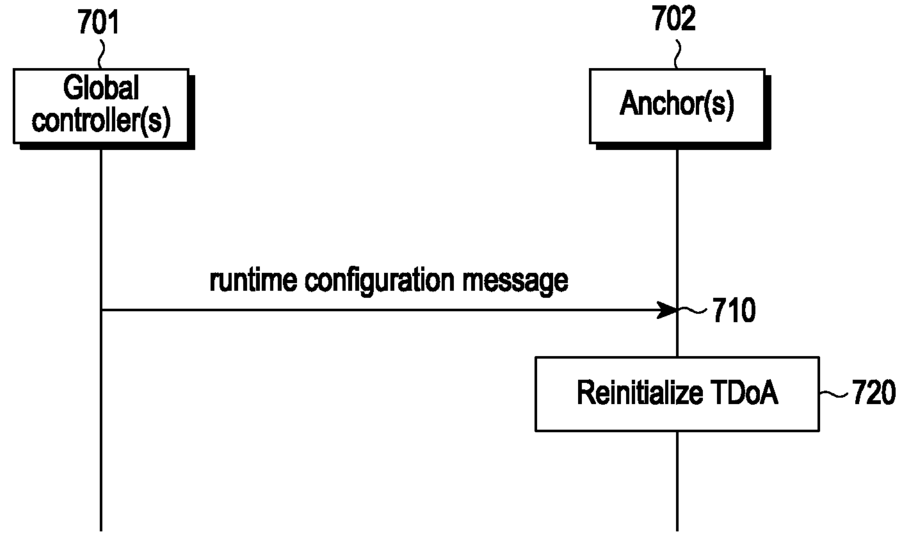
FIG. 7 illustrates a method for changing configuration using a runtime configuration scheme according to an embodiment.

FIG. 7 illustrates a method for changing configuration using a runtime configuration scheme according to an embodiment.

The method for FIG. 7 may be performed by at least one global controller 701 and at least one anchor device 702.

In FIG. 7, the global controller 701 transmits a runtime configuration message for changing/resetting the multi-cluster configuration. Herein, the runtime configuration message may be referred to as a configuration message or a configuration change message.

The global controller 701 may be an anchor device constituting a cluster. For example, the global controller 701 may be an initiator anchor or a responder anchor constituting a specific cluster. In an embodiment, the global controller 701 may be a device that does not constitute a cluster. In other words, the global controller 701 may be a device that does not belong to a multi-cluster. For example, the global controller 701 may be a tag device (e.g., the user's mobile device) that does not constitute a cluster.

In FIG. 7, the anchor device 702 receives the runtime configuration message transmitted from the global controller and reinitializes the TDoA based on the runtime configuration message. As an embodiment, the anchor device 702 may change the multi-cluster configuration based on the received runtime configuration message.

When the global controller 701 is the initiator anchor of a first cluster, the anchor device 702 may include responder anchors of a first cluster and/or the initiator anchor, and/or responder anchors of at least one second cluster different from the first cluster. In this case, the at least one second cluster may be a cluster within the communication range of the global controller 701.

When the global controller 701 is the responder anchor of the first cluster, the anchor device 702 may include a responder anchor(s) different from the initiator anchor of the first cluster and/or the initiator anchor and/or responder anchors of at least one second cluster different from the first cluster. In this case, the at least one second cluster may be a cluster within the communication range of the global controller 701.

When the global controller 701 is a device that does not belong to the multi-cluster, the anchor device 702 may be at least one anchor device within the communication range of the global controller 701.

Referring to FIG. 7, in operation 710, the global controller 701 may transmit a runtime configuration message. The global controller 701 may broadcast the runtime configuration message. Various examples of runtime configuration message configurations are described below with reference to FIGS. 9 to 11.

The global controller 701 may transmit the runtime configuration message through a predefined packet (e.g., an STS packet). For example, the runtime configuration message may be transmitted through the packet illustrated in FIG. 8.

In operation 720, the anchor device 702 may receive the runtime configuration message and reinitialize the DL-TDoA based on the received runtime configuration message. As an embodiment, the anchor device 702 may change the multi-cluster configuration for DL-TDoA based on the runtime configuration message. For example, the anchor device 702 may change the configuration, such as the role of the anchor device 702, the number (index) of the cluster where the anchor device 702 belongs, and/or the number (index) of the ranging round allocated for the cluster having the cluster number (index).

Figure 8A:
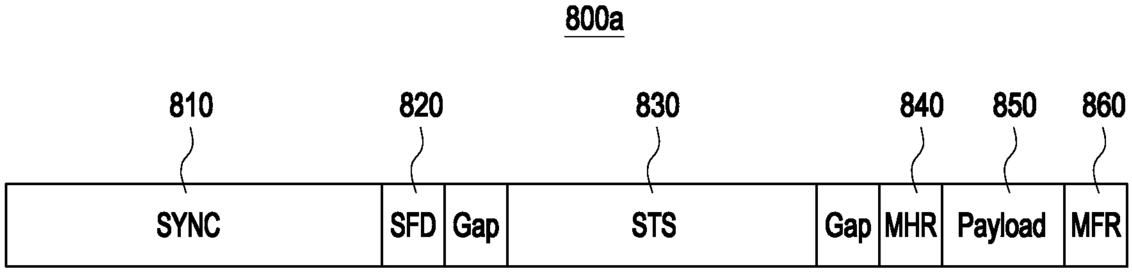
FIG. 8A illustrates a structure of a packet for transmitting a runtime configuration message according to an embodiment.

FIG. 8A illustrates a structure of a packet for transmitting a runtime configuration message according to an embodiment.

In FIG. 8A, the packet 800*a* may be an example of a PHY packet (STS packet) having a value of STS packet (SP) configuration 1 (SP1).

Referring to FIG. 8A, the packet 800*a* may include a SYNC field 810 for synchronization, a start-of-frame delimiter (SFD) field 820, an STS field 830, an MHR 840, a payload (MAC payload) 850 and/or a MAC footer (MFR) 860. As an embodiment, in the packet 800*a*, a first GAP may be included between the SFD field 820 and the STS field 830, and a second GAP may be included between the STS field 830 and the MHR 840.

In FIG. 8A, the STS field 830 may be positioned after a synchronization field (810) and the SFD field 820, and before a MAC header (MHR) 840 (or a PHY header (PHR) field).

In FIG. 8A, the area including the MHR 840, the payload (MAC payload) 850 and the MFR 860 may be referred to as a PHY payload (PHY SDU). This PHY SDU may include the MHR 840, MAC payload 850, and MFR 860 of the UWB MAC frame as defined in IEEE 802.15.4/4z. As an embodiment, the MAC payload 850 may include at least one payload IE.

The static STS configuration may be used in the packet 800 for transmitting the runtime configuration message. In this case, the STS field 830 may include information/data for setting the value of the static STS.

The runtime configuration message may be transmitted through at least one packet 800. Data of the runtime configuration message may be included and transmitted in the payload 850 of the packet 800.

Figure 8B:
FIG. 8B illustrates another structure of a packet for transmitting a runtime configuration message according to an embodiment.

FIG. 8B illustrates another structure of a packet for transmitting a runtime configuration message according to an embodiment.

Referring to FIG. 8B, similar to the packet 800*a* of FIG. 8A, the packet 800*b* may include a SYNC field 810, an SFD field 820, an STS field 830, an MHR 840, a payload 850 and/or an MFR 860.

Referring to FIG. 8B, the packet 800*b* may include a plurality of payload IEs 850*a* and 850*b* in the MAC payload 850 part. In this case, one payload IE 850*a* may include a parameter related to a downlink TDoA operation, and the other payload IE 850*b* may include a runtime configuration message parameter. The order and position of the payload IEs including the downlink TDoA operation parameter and the runtime configuration message parameter may be changed.

When there is a plurality of payload IEs in the MAC payload 850, the payload IEs may be distinguished by the following payload termination IEs.

Hereinafter, an example of a downlink TDoA message is first described with reference to FIGS. 9 to 11, and various embodiments for the runtime configuration message are described.

First Embodiment

A first embodiment for the runtime configuration message may include at least one of the following features.

- The runtime configuration message may include a type field and/or a configure parameter field for the runtime configuration (or multi-cluster configuration). The type field may include information indicating that the UWB message, OWR message, or DT message is a management message (e.g., a runtime configuration message). The configure parameter field may include at least one parameter for runtime configuration (or multi-cluster configuration). In the first embodiment, the type field may be referred to as a first field. In the first embodiment, the configure parameter field may be referred to as a second field or a runtime configuration parameter field.
- The runtime configuration message may include a flag field containing information indicating whether the configure parameter field is included in the runtime configuration message. The flag field may be used to indicate that the corresponding message is a runtime configuration message (or that the corresponding message includes a runtime configuration-related parameter). In the first embodiment, the flag field may be referred to as a third field or a configure parameter present bit field.

The runtime configuration message of the first embodiment may be used when an anchor device belonging to the multi-cluster is set as a global controller.

Parameters and fields for runtime configuration of the runtime configuration message may be included and transferred in the data transfer IE (e.g., data transfer IE), as described below. In this case, the configure parameter field may be included and transferred in the content field of the data transfer IE.

Hereinafter, a downlink TDoA message and a runtime configuration message of the first embodiment will be exemplarily described with reference to FIG. 9.

Figure 9E:
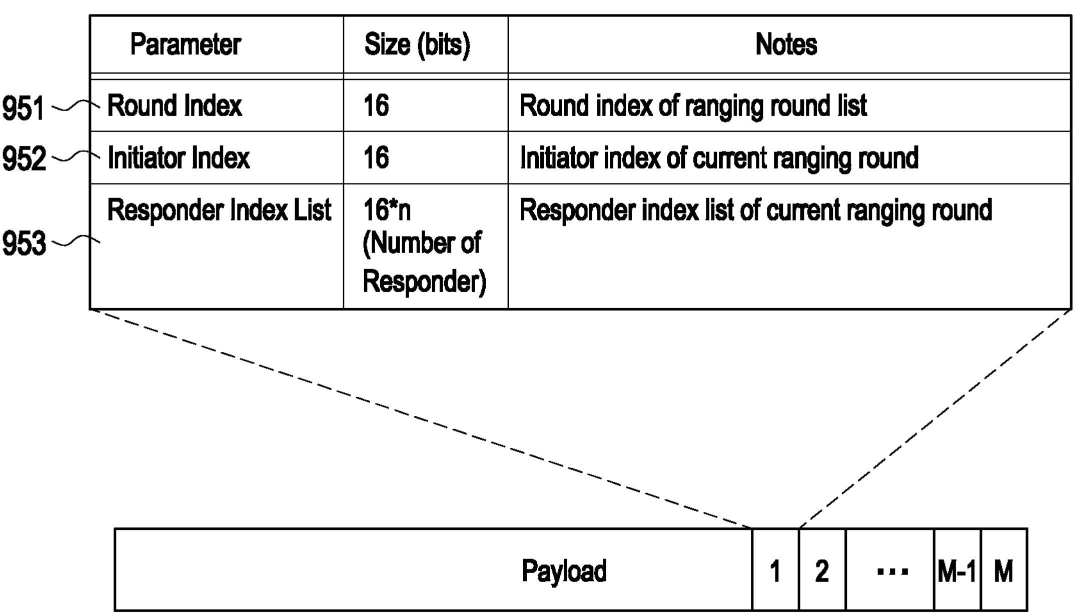
FIG. 9E illustrates a configure parameter field for a runtime configuration included in a runtime configuration message according to a first embodiment.

FIG. 9A illustrates a downlink TDoA message according to an embodiment. FIG. 9B illustrates a runtime configuration message according to a 1-1st embodiment. FIG. 9C illustrates a runtime configuration message according to a 1-2nd embodiment. FIG. 9D illustrates a message control field included in a runtime configuration message according to the 1-1st embodiment or the 1-2nd embodiment. FIG. 9E illustrates a configure parameter field for a runtime configuration included in a runtime configuration message according to a first embodiment.

Downlink TDoA Message

Further to FIG. 9A, the downlink TDoA message may include a payload IE for the downlink TDoA. FIG. 9A is an example of the payload IE (downlink TDoA payload IE) of the downlink TDoA message.

As illustrated in FIG. 9A, the downlink TDoA payload IE 900*a* may include at least one of the following parameters (fields):

- Vendor OUI: Vendor OUI is a field including a unique value of the vendor defining a message to ensure the uniqueness of the messages based on the IEEE standard. For example, the payload IE defined in FiRa consortium may include a value of 0x5A18FF.
- UWB message ID: The UWB message ID may be a field indicating which message the corresponding payload IE is. The downlink TDoA payload IE may have a value of 0x07 to indicate that it is an OWR-related message, which is of a higher category of the downlink TDoA.
- OWR message type: The OWR message type may be a parameter that additionally indicates what kind of message it is specifically when designating that the UWB message ID is an OWR message. In the case of downlink TDoA, the OWR message type may be used to distinguish between the UL-TDoA blink message and UL-TDoA synchronization message used in uplink TDoA, and the poll, response, final DTM, and angle of arrival (AoA) measurement message used in downlink TDoA. Meanwhile, the OWR message type may be divided into two sub fields (e.g., OWR message type 920 and message type 930 of FIG. 9B) to distinguish messages for the same purpose as in FIG. 9B.
- Message control: The message control field is a field including information about the presence or absence of various parameters included in the corresponding message and, in the case of parameters expressed in a list form, the number of elements included in the list or the length of the parameter.
- Block index: The block index indicates the index of the ranging block where the corresponding message is transmitted. A plurality of ranging rounds may be included in one ranging block.

Round index: The round index indicates the index of the ranging round where the corresponding message is transmitted.

Tx timestamp: The Tx timestamp field includes the time-stamp of when the corresponding message is transmitted. By using the Tx timestamp, the DT-anchor or DT-tag may be used for operations related to the downlink-TDoA, e.g., synchronization, correction of the clock speed difference, and calculation of TDoA.

Ranging device management list: The ranging device management list is a parameter including scheduling information, such as the ranging slot in which the response DT-anchor in the same cluster as the initiator DT-anchor should send the response DTM.

Clock frequency offset (CFO): CFO is a value indicating a speed difference between the clock of the response DT-anchor and the clock of the initiator DT-anchor. The value may be used by the DT-tag to calculate the correct TDoA.

Reply time list: The reply time list is a parameter included in the final DTM and is a parameter including a list of response times of the final DTM to the response DTM. When the initiator DT-anchor receives a plurality of response DTMs, the respective response times for the received response DTMs may be configured in the form of a list.

Responder reply time: The responder reply time is a parameter that is measured by the response DT-anchor and included in the response DTM and indicates the response time from the time of reception of the poll DTM transmitted by the initiator DT-anchor to the time of transmission of the response DTM.

Inter-cluster synchronization: The inter-cluster synchronization field may be a field including a parameter used to maintain the same ranging block structure by time synchronization between adjacent clusters in an infrastructure in which a plurality of clusters is installed.

Anchor location: The anchor location field may be a field that is included in the poll, response, and final DTM and used to transfer its location information to the DT-tag.

Vendor-specific data: The vendor-specific data field may be a field used by the anchor vendor to transmit additional information for other purposes.

Meanwhile, the downlink TDoA payload IE may further include other parameters in addition to the parameters listed above.

Hereinafter, an example of a runtime configuration message is described with reference to FIG. 9B and FIG. 9C. The runtime configuration message may additionally include runtime configuration-related information in the downlink TDoA message of FIG. 9A.

Runtime Configuration Message (900*b* of FIG. 9B) According to the 1-1st Embodiment and Runtime Configuration Message (900*c* of FIG. 9C) According to the 1-2nd Embodiment The runtime configuration message may include payload IE for runtime configuration. FIG. 9B and FIG. 9C respectively illustrate the 1-1st embodiment and the 1-2nd embodiment of the payload IE (runtime configuration payload IE) of the runtime configuration message. In FIG. 9B and FIG. 9C, the description of the fields of FIG. 9A may be applied to a description of the fields overlapping the fields in FIG. 9A, except for the fields added/modified for the runtime configuration message.

Herein, the runtime configuration message 900*b* of FIG. 9B may be referred to as a first runtime configuration message, and the runtime configuration message 900*c* of FIG. 9C may be referred to as a second runtime configuration message. Further, the runtime configuration message 900*b* and the runtime configuration message 900*c* may be collectively referred to as a runtime configuration message.

The runtime configuration messages 900*b* and 900*c* may be included in the payload 850 of FIG. 8A.

The runtime configuration messages 900*b* and 900*c* may be OWR messages having the DTM type. To indicate that the corresponding message is an OWR message having the DT message type, the first runtime configuration message 900*b* may include a UWB message ID field 910 set as the value (e.g., 0x07) indicating the OWR message and an OWR message type field 920-1 set as the value (e.g., 0) indicating the DTM, as shown in FIG. 9A.

The first runtime configuration message 900*b* may include a message type field 930 including information indicating that the DT message (or UWB/OWR message) is a management message (e.g., runtime configuration message 900*b*). The message type field 930 may be set to one of a first value (e.g., 0) indicating that the DT message (or UWB/OWR message) is a poll message, a second value (e.g., 1) indicating that the DT message (or UWB/OWR message) is a response message, a third value (e.g., 2) indicating that the DT message (or UWB/OWR message) is a final message, or a fourth value (e.g., 3) indicating that the DT message (or UWB/OWR message) is a management message. In this case, when the message is a runtime configuration message, the message type field 930 may be set as the fourth value indicating that the DT message (or UWB/OWR message) is a management message. In other words, the message type field 930 set as the fourth value may indicate that the DT message (or UWB/OWR message) is a management message (e.g., the first runtime configuration message 900*b*).

Referring to FIG. 9C, the second runtime configuration message 900*c* may be a message including the second OWR message type field 920-2 obtained by integrating the OWR message type field 920-1 of the first runtime configuration message 900*b* and the message type field 930. The second OWR message type field 920-2 may be used to indicate one of the messages for detailed functions belonging to the one-way ranging category. As an example, the second OWR message type field 920-2 may indicate one of a UL-TDoA blink message and a UL-TDoA synchronization message used for uplink TDoA. Further, the second OWR message type field 920-2 may indicate one of the poll DTM, response DTM, and final DTM used for downlink TDoA. Further, the second OWR message type field 920-2 may indicate that it is an AoA measurement message. The second OWR message type field 920-2 may indicate that it is a management message including a runtime configuration message proposed at the same level as the above messages.

The runtime configuration messages 900*b* and 900*c* may include a configure parameter field 950 including at least one parameter for runtime configuration.

The presence or absence of the configure parameter field 950 may be identified by the value of the message control field 940. For example, as shown in FIG. 9B, the message control field 940 may include a configure parameter present bit field 941 to indicate whether there is the configure parameter field 950 (i.e., whether the configure parameter field 950 is included in the runtime configuration messages 900*b* and 900*c*). As illustrated in FIG. 9D, the configure parameter present bit field 941 may be set to a first value (e.g., 0) to indicate that the configure parameter field 950 is absent or a second value (e.g., 1) to indicate that the configure parameter field 950 is present. The configure parameter present bit field 941 set to the first value may indicate that the configure parameter field 950 is absent (that is, the configure parameter field 950 is not included in the runtime configuration message 900). The configure parameter present bit field 941 set to the second value may indicate that the configure parameter field 950 is present (i.e., the configure parameter field 950 is included in the runtime configuration messages 900*b* and 900*c*).

The configure parameter present bit field 941 may be used to indicate that the corresponding message is a runtime configuration message (or that the corresponding message includes a runtime configuration-related parameter). For example, as shown in FIG. 9B, when the message type field 930 is set to a value indicating that the message is a management message, and the configure parameter present bit field 941 is set to a value indicating that the configure parameter field 950 is present, the message may be identified as a runtime configuration message. Alternatively, when the configure parameter present bit field 941 is set to the value indicating that the configure parameter field 950 is present regardless of the value of the message type field 930, it may indicate that the message includes the runtime configuration-related parameter. Meanwhile, as the type of management message, only one runtime configuration message may be present, in which case it may be identified only with the value of the message type field 930 that the message is a runtime configuration message.

The configure parameter field 950 may include at least one parameter for runtime configuration (or multi-cluster configuration). For example, the configure parameter field 950 may include at least one parameter for applying/changing the configuration for each cluster constituting the multi-cluster. The configure parameter field 950 may include information about a plurality of clusters.

Referring to FIG. 9E, the configure parameter field 950 may include a round index parameter 951, an initiator index parameter 952, and/or a responder index list parameter 952 for a corresponding cluster. For example, the configure parameter field 950 may include a round index parameter 951, an initiator index parameter 952, and/or a responder index list parameter 953 for each cluster belonging to the multi-cluster. For example, as shown in FIG. 9E, when the multi-cluster includes M clusters, the configure parameter field 950 may include a round index parameter 951, an initiator index parameter 952, and/or a responder index list parameter 952 for each of the M clusters. Herein, the initiator index parameter (field) may be referred to as an initiator address parameter (field), and the responder index list parameter may be referred to as a responder DT-anchor management list parameter (field).

The configure parameter field 950 may be included at the end of the payload of the packet that transmits the runtime configuration messages 900*b* and 900*c*.

The round index parameter 951 may include the round index of the ranging round list for the corresponding cluster. The round index parameter 951 may indicate the index of the ranging round in the ranging round list to be allocated to the corresponding cluster (current cluster). Through the round index parameter 951, the ranging round allocated to the corresponding cluster may be identified. The round index parameter 951 may be used as an identifier of the cluster composed of DT-anchors formed by the following initiator index parameter 952 and the responder index list 953.

The initiator index parameter 952 may include an initiator index that identifies the initiator DT-anchor of the current ranging round for the cluster operating in the ranging round identified by the round index 951. Here, the current ranging round may be the ranging round allocated to the corresponding cluster indicated by the round index parameter 951. Through the initiator index parameter 952, the anchor device serving as the initiator anchor in the ranging round of the cluster may be identified.

The responder index list parameter 953 may include a responder index list of identifiers identifying the responder DT-anchors of the current ranging round for the cluster operating in the ranging round identified by the round index 951. Here, the current ranging round may be the ranging round allocated to the corresponding cluster indicated by the round index parameter 951. Through the responder index list parameter 953, anchor devices (i.e., the list of anchor devices) serving as responder anchors in the ranging round of the cluster may be identified.

Second Embodiment

A second embodiment for the runtime configuration message may include at least one of the following features:

The runtime configuration message may include a type field for runtime configuration. As an embodiment, the type field may include information indicating that the UWB message, OWR message, or DT message is a management message (e.g., a runtime configuration message). In the second embodiment, the type field may be referred to as a first field.

The runtime configuration message may include a flag field containing information indicating whether the configure parameter field is present. The flag field may be used to indicate that the corresponding message is a runtime configuration message (or that the corresponding message includes a runtime configuration-related parameter). In the second embodiment, the flag field may be referred to as a second field or a configure parameter present bit field.

In the second embodiment, unlike the first embodiment, at least one parameter for runtime configuration may be transferred through the ranging device management list field and round index field of the runtime configuration message included in the existing OWB message (or DT message (e.g., the message 900*a* of FIG. 9A)), rather than a separate configure parameter field being included in the runtime configuration message. Accordingly, the flag field of the second embodiment is used to indicate that the message is a runtime configuration message (or that the message includes the runtime configuration-related parameter), but not to indicate whether the configure parameter field is present.

The runtime configuration message of the second embodiment may be used when an anchor device belonging to the multi-cluster is set as a global controller.

Hereinafter, a runtime configuration message of the second embodiment is described with reference to FIG. 10.

FIG. 10A illustrates a runtime configuration message according to a second embodiment. FIG. 10B illustrates a message control field included in a runtime configuration message according to the second embodiment.

In The description of the fields of FIG. 9A may be applied to a description of the overlapping fields of FIG. 10A, except for the fields added/modified for the runtime configuration message.

The runtime configuration message 1000 may be included in the payload 850 of the packet 800 of FIG. 8.

The runtime configuration message 1000 may be OWR messages having the DT message type. To indicate that the corresponding message is an OWR message having the DTM message type, the runtime configuration message

1000 may include a UWB message ID field 1010 set as the value (e.g., 0x07) indicating the OWR message and an OWR message type field 1020 set as the value (e.g., 0) indicating the DTM as shown in FIG. 10A.

The runtime configuration message 1000 may include a message type field 1030 including information for indicating that the DT message (or UWB/OWR message) is a management message (e.g., runtime configuration message 1000). As an embodiment, the message type field 1030 may be set to one of a first value (e.g., 0) indicating that the DT message (or UWB/OWR message) is a poll message, a second value (e.g., 1) indicating that the DT message (or UWB/OWR message) is a response message, a third value (e.g., 2) indicating that the DT message (or UWB/OWR message) is a final message, or a fourth value (e.g., 3) indicating that the DT message (or UWB/OWR message) is a management message.

When the DT message (or UWB/OWR message) is a runtime configuration message, the message type field 1030 may be set as the fourth value indicating that the DT message (or UWB/OWR message) is a management message. In other words, the message type field 1030 set as the fourth value may indicate that the DT message (or UWB/OWR message) is a management message (e.g., the runtime configuration message 1000).

The runtime configuration message 1000 may include a message control field 1040. Referring to FIG. 10B, the message control field 1040 may include a configure parameter present bit field 1041 for indicating whether the configure parameter is present. The configure parameter present bit field 1041 may be set to a first value (e.g., 0) to indicate that the configure parameter is absent or a second value (e.g., 1) to indicate that the configure parameter is present. In this case, the configure parameter present bit field 1041 set to the first value may indicate that the configure parameter is absent, and the configure parameter present bit field 1041 set to the second value may indicate that the configure parameter is present.

The configure parameter present bit field 1041 may be used to indicate that the corresponding message is a runtime configuration message (or that the corresponding message includes a runtime configuration-related parameter). For example, when the message type field 1030 is set to the value indicating that the corresponding message is a management message, and the configure parameter present bit field 1041 is set to the value indicating that the configure parameter is present, it may be identified that the corresponding message is the runtime configuration message (or that the message includes a runtime configuration-related parameter). Alternatively, when the configure parameter present bit field 1041 is set to the value indicating that the configure parameter field 1050 is present regardless of the value of the message type field 1030, it may indicate that the message includes the runtime configuration-related parameter. Meanwhile, as the type of management message, only one runtime configuration message 1000 may be present, in which case it may be identified only with the value of the message type field 1030 that the message is a runtime configuration message 1000.

The runtime configuration message 1000 may transfer at least one parameter for runtime configuration through the round index field 1050 and the ranging device management list field 1060.

The round index field 1050 may include the round index of the current ranging round list. The round index field 1050 may indicate the index of the ranging round in the ranging round list to be allocated to at least one cluster. The round index field 1050 may include the round index for each cluster constituting the multi-cluster. Through the round index parameter, the ranging round allocated to the corresponding cluster may be identified.

The ranging device management list field 1060 may include N ranging device management list elements. Each of the N ranging device management list elements may include the initiator index parameter and/or the responder index list parameter of the current ranging round for the associated cluster. The ranging device management list field 1060 may include the initiator index parameter and/or the responder index list parameter for each cluster constituting the multi-cluster.

The initiator index parameter may include the initiator index of the current ranging round for the corresponding cluster. Here, the current ranging round may be the ranging round allocated to the corresponding cluster indicated by the round index parameter. Through the initiator index parameter, the anchor device serving as the initiator anchor in the ranging round of the cluster may be identified.

The responder index list parameter may include the responder index list of the current ranging round for the corresponding cluster. Here, the current ranging round may be the ranging round allocated to the corresponding cluster indicated by the round index parameter. Through the responder index list parameter, anchor devices (list of anchor devices) serving as responder anchors in the ranging round of the cluster may be identified.

Third Embodiment

A third embodiment for the runtime configuration message may include at least one of the following features:

- The runtime configuration message may include a type field for runtime configuration. The type field may include information for indicating whether the management message is a management message for configuration. In the third embodiment, the type field may be referred to as a first field.
- The runtime configuration message may include a flag field containing information for indicating whether the configure parameter field is present. The flag field may be used to indicate that the corresponding message is a runtime configuration message (or that the corresponding message includes a runtime configuration-related parameter). In the third embodiment, the flag field may be referred to as a first field or a configure parameter present bit field.

In the third embodiment, if there is the configure parameter, the configure parameter may be transferred through a separately added configuration parameter field as in the first embodiment, or through the round index field and ranging device management list included in the existing OWB message (or DT message) as in the second embodiment.

The runtime configuration message of the third embodiment may be used when a device not belonging to the multi-cluster is set as a global controller.

Hereinafter, a runtime configuration message of the third embodiment is exemplarily described with reference to FIG. 11A to 11F.

FIG. 11A illustrates a runtime configuration message according to a third embodiment. FIG. 11B illustrates a message control field included in a runtime configuration message according to the third embodiment.

Regarding FIGS. 11A and 11B, the description of the fields of FIG. 9A may be applied to a description of the fields overlapping the fields in FIG. 9A, except for the fields added/modified for the runtime configuration message.

A runtime configuration message 1100 may be included in the payload 850 of the packet 800 of FIG. 8.

The runtime configuration message 1100 may be OWR messages having the management message type. To indicate that the corresponding message is an OWR message having the management message type, the runtime configuration message 1100 may include a UWB message ID field 1110 set as the value (e.g., 0x07) indicating the OWR message and an OWR message type field 1120 set as the value (e.g., 1) indicating the management message type as shown in FIG. 11A.

The runtime configuration message 1100 may include a message type field 1130 to indicate the message type of the OWB message having the type indicated by the OWR message type field 1120.

When the OWR message type field 1120 indicates that the OWB message is a DT message (e.g., when the OWR message type field 1120 is set to the first value (e.g., 0)), the message type field 1130 may be set to one of the first value (e.g., 0) indicating that the DT message is a poll message, the second value (e.g., 1) indicating that the DT message is a response message, or the third value (e.g., 2) indicating that the DT message is a final message.

When the OWR message type field 1120 indicates that the OWB message is a management message (e.g., when the OWR message type field 1120 is set to the second value (e.g., 1)), the message type field 1130 may be set to one of the first value (e.g., 0) indicating that the management message is a stop message for stopping the operation, the second value (e.g., 1) indicating that the management message is a configuration message for setting the parameter, or the third value (e.g., 2) indicating that the management message is a restart message for restarting the operation. When the corresponding message is the runtime configuration message 1100, the OWR message type field 1120 may be set to the second value (e.g., 1) indicating that the management message is the configuration message for setting the parameter.

The runtime configuration message 1100 may include a message control field 1140. The message control field 1140 may include a configure parameter present bit field 1141 (FIG. 11B) indicating whether the configure parameter is present. As an embodiment, the configure parameter present bit field 1141 may be set to at least one of a first value (e.g., 0) to indicate that the configure parameter is absent or a second value (e.g., 1) to indicate that the configure parameter is present.

The configure parameter present bit field 1141 may be used to indicate that the management message (or UWB/OWR message) is a runtime configuration message (or that the message includes a runtime configuration-related parameter). For example, when the OWR message type field 1120 is set to a value indicating that the OWB message is a management message, the message type field 1130 is set to a value indicating that the management message is a configuration message, and the configure parameter field 1170 is set to a value indicating that the configure parameter is present, the management message (or UWB/OWR message) may be the runtime configuration message.

When the management message (or UWB/OWR message) is the runtime configuration message (and/or when the configure parameter present bit field 1141 is set to a value indicating that the configure parameter is present), at least one parameter for runtime configuration may be transmitted through the configure parameter field 1170 or transferred through the round index field 1150 and the ranging device management list 1160.

The description of FIG. 9E may be applied to a description of the embodiment in which at least one parameter for runtime configuration is transmitted through the configure parameter field 1170. That is, the configure parameter field 1170 is the same as the configure parameter field 950 of FIG. 9E, and the description for parameters (fields) included in the configure parameter field 1170 may refer to the corresponding description for parameters (fields) included in the configure parameter field 950 of FIG. 9E. The description of FIG. 10B may be applied to a description of the embodiment in which at least one parameter for runtime configuration is transferred through the round index field 1150 and the ranging device management list 1160.

FIG. 11C illustrates a data transfer IE message including a runtime configuration parameter according to an embodiment.

Referring to FIG. 11C, the data transfer IE 1100*c* that may include the runtime configuration parameter may include a vendor OUI 1110*c* that is included to receive uniqueness of the message. Further, the data transfer IE 1100*c* may include a value indicating that it is a data transfer IE in the UWB message ID 1120*c*. Further, the data transfer IE 1100*c* may include a data transfer content type field 1130*c* to designate the type of content included in the data transfer IE. The content field 1140*c* of the data transfer IE 1100*c* may include data to be transferred through the data transfer IE, and its form may be changed depending on the specific value of the data transfer content type 1130*c*. The basic form of the content 1140*c* may be composed of a message length and a message.

FIG. 11D illustrates an example of a runtime configuration message including a plurality of payload IEs according to an embodiment.

Referring to FIG. 11D, the runtime configuration message 1100*d* may include payload IE 1110*d* for downlink TDoA (e.g., similar to the runtime configuration message 900*b* for downlink TDoA of FIG. 9B) and data transfer IE 1120*d* including the configure parameter (e.g., the data transfer IE 1100*c* of FIG. 11C) connected or combined together. In this case, a payload termination IE may be included between the downlink TDoA payload IE 900*b* and the data transfer IE 1100*c* to distinguish between the two.

FIG. 11E illustrates another example of a runtime configuration message according to the third embodiment. FIG. 11F illustrates another example of a configure parameter field included in a runtime configuration message according to the third embodiment.

In FIG. 11E, the runtime configuration message may be another example of the aforementioned runtime configuration message 1110.

Referring to FIG. 11E, the runtime configuration message (or, UWB/OWR message) may include an OWR message type field 1120*e* and a management message type field 1130*e*.

The OWR message type field 1120*e* may be another example of the OWR message type field 1120. The OWR message type field 1120*e* may indicate a type of the OWB message. As an embodiment, the OWR message type field 1120*e* may be set to one of a first value (e.g., 0) indicating that the OWB message is a blink UL-TDoA message (UTM), a second value (e.g., 1) indicating that the OWB message is a UL-TDoA synchronization message (synchronization UTM), a third value (e.g., 2) indicating that the OWB message is a poll DTM, a fourth value (e.g., 3)

indicating that that the OWB message is a response DTM, a fifth value (e.g., 4) indicating that the OWB message is a final DTM, a sixth value (e.g., 5) indicating that the OWB message is a message for AoA advertisement (AoA measurement), or a seventh value (e.g., 6) indicating that the OWB message is a management message.

The management message type field 1130*e* may be another example of the message type field 1130 (FIG. 11A). The management message type field 1130*e* may indicate a type of the management message. The management message type field 1130*e* may be set to one of a first value (e.g., 0) indicating that the management message is a configuration message (e.g., a configuration message for multi-cluster configuration (runtime configuration message)), a second value (e.g., 1) indicating that the management message is a stop message for stopping of operation (e.g., DL-TDoA operation), a third value (e.g., 2) indicating that the management message is an ACK message for acknowledgment (e.g., ACK for the stop message) or a fourth value (e.g., 3) indicating that the management message is a restart message for restarting an operation (e.g., DL TDoA operation). The management message type field 1130*e* may be included only when the type of the OWB message is set to the management message.

The runtime configuration message (or, UWB/OWR message) may further include a configure parameter field 1170*e*.

The configure parameter field 1170*e* may be another example of the configure parameter field 1170 (FIG. 11A). The presence/absence of the configure parameter field 1170*e* may be indicated by the configure parameter present bit field included in the message control field of the runtime configuration message. The above description of the configure parameter present bit field 1141 may be applied to the configure parameter present bit field for the configure parameter field 1170*e*.

Referring to FIG. 11F, the configure parameter field 1170*e* may include a round index field 1171*e*, an initiator address field 1172*e*, and a responder DT-anchor management list field 1173*e*. The configure parameter field 1170*e* may include a round index field 1171*e*, an initiator address field 1172*e*, and a responder DT-anchor management list field 1173*e* for each cluster belonging to the multi-cluster.

The round index field 1171*e* and the initiator address field 1172*e* are the same as the round index parameter 951 and the initiator index parameter 952, respectively, and the corresponding description of FIG. 9E may be referenced regarding round index field 1171*e* and the initiator address field 1172*e*.

The responder DT-anchor management list field 1173*e* may be an example of the responder index list parameter 953. Referring to FIG. 11F, the responder DT-anchor management list field 1173*e* may include N Responder DT-anchor management list elements. The number N of elements may be determined by the value of the responder DT-anchor management list length field in the message control field.

Each responder DT-anchor management list element includes a responder address field. The responder address field may indicate the address (e.g., MAC address) of the corresponding responder DT-anchor. The address of the responder DT-Anchor may be used as an identifier (identification information) to identify the responder DT-Anchor. The responder DT-anchors included in the corresponding cluster may be identified through the responder address field of each responder DT-anchor management list element.

Each responder DT-anchor management list element may further include a ranging slot index field and a ToF result field. The ranging slot index field may indicate a ranging slot index through which the responder DT-anchor identified by the corresponding responder address field transmits its own response DTM. The ToF result field may include ToF result data.

Figure 12:
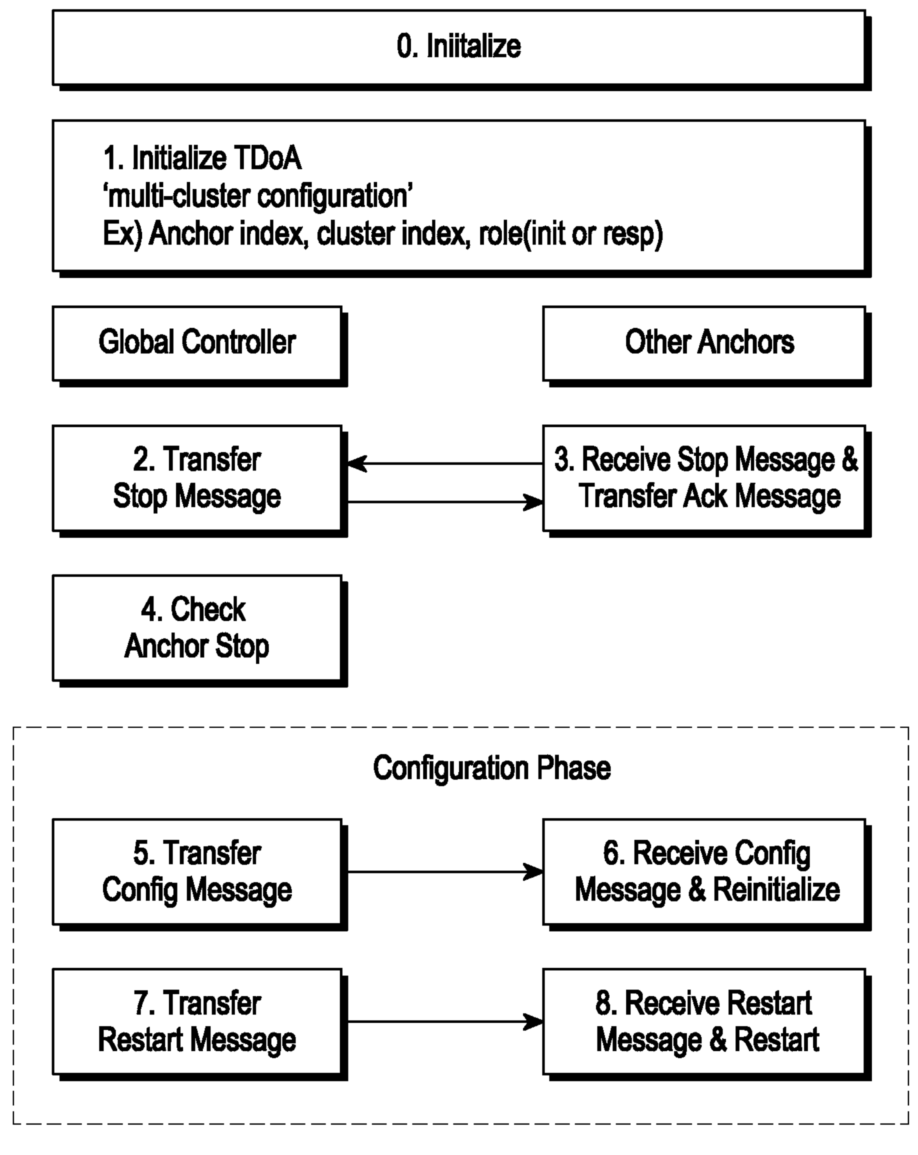
FIG. 12 illustrates a procedure for a runtime configuration according to an embodiment.

FIG. 12 illustrates a procedure for runtime configuration according to an embodiment.

Referring to FIG. 12, in operation 0, anchor devices constituting the multi-cluster are initialized.

In operation 1 of FIG. 12, the multi-cluster configuration for TDoA (DL-TDoA) are initialized. Thus, the anchor devices constituting the multi-cluster may operate based on initially set roles and the cluster schedule.

Thereafter, the multi-cluster configuration may need to be reset/changed. In this case, at least one anchor device among the anchor devices belonging to the multi-cluster or at least one electronic device (e.g., the user's mobile device) not belonging to the multi-cluster may be set as the global controller. Thereafter, the global controller may perform the following operations for changing the multi-cluster configuration with other anchor devices.

In operation 2 of FIG. 12, the global controller transmits a stop message for stopping the operation for TDoA (TDoA operation) to the anchor devices. The stop message corresponds to one of the types of the management message described above.

In operation 3 of FIG. 12, the anchor devices receive the stop message, stops the TDoA operation based on the stop message, and transmits an Ack message to the global controller in response to the stop message. The ACK message corresponds to one of the types of the management message, as described above.

In operation 4 of FIG. 12, the global controller may receive an Ack message and identify that operation has stopped in the anchor devices, based on the Ack message.

In operation 5 of FIG. 12, the global controller may transmit a configuration message to the anchor devices. The configuration message corresponds to one of the types of the management message, as described above.

The configuration message may be, e.g., the runtime configuration messages 900*b* and 900*c* of FIG. 9B and FIG. 9C, respectively, the runtime configuration message 1000 of FIG. 10A, the runtime configuration message 1100 of FIG. 11A, or the runtime configuration message of FIG. 11E. The configuration message may be included and transmitted in the payload 850 of the packet 800 of FIG. 8A.

In operation 6 of FIG. 12, other anchor devices receive the configuration message and reinitializes the multi-cluster configuration based on the configuration message. For example, the anchor device may change/reset the role of the anchor and/or the cluster schedule based on the configuration message.

In operation 7 of FIG. 12, the global controller transmits a restart message for restarting the TDoA operation to the other anchor devices. The restart message corresponds to one of the types of the management message, as described above.

In operation 8 of FIG. 12, the other anchor devices receive the restart message and perform the TDoA operation, based on the reset/changed multi-cluster configuration.

In an embodiment, operations 4 to 8 of FIG. 12 may be included in a configuration phase. However, only operations 4 and 5 of FIG. 12 may be included in the configuration phase.

Figure 13:
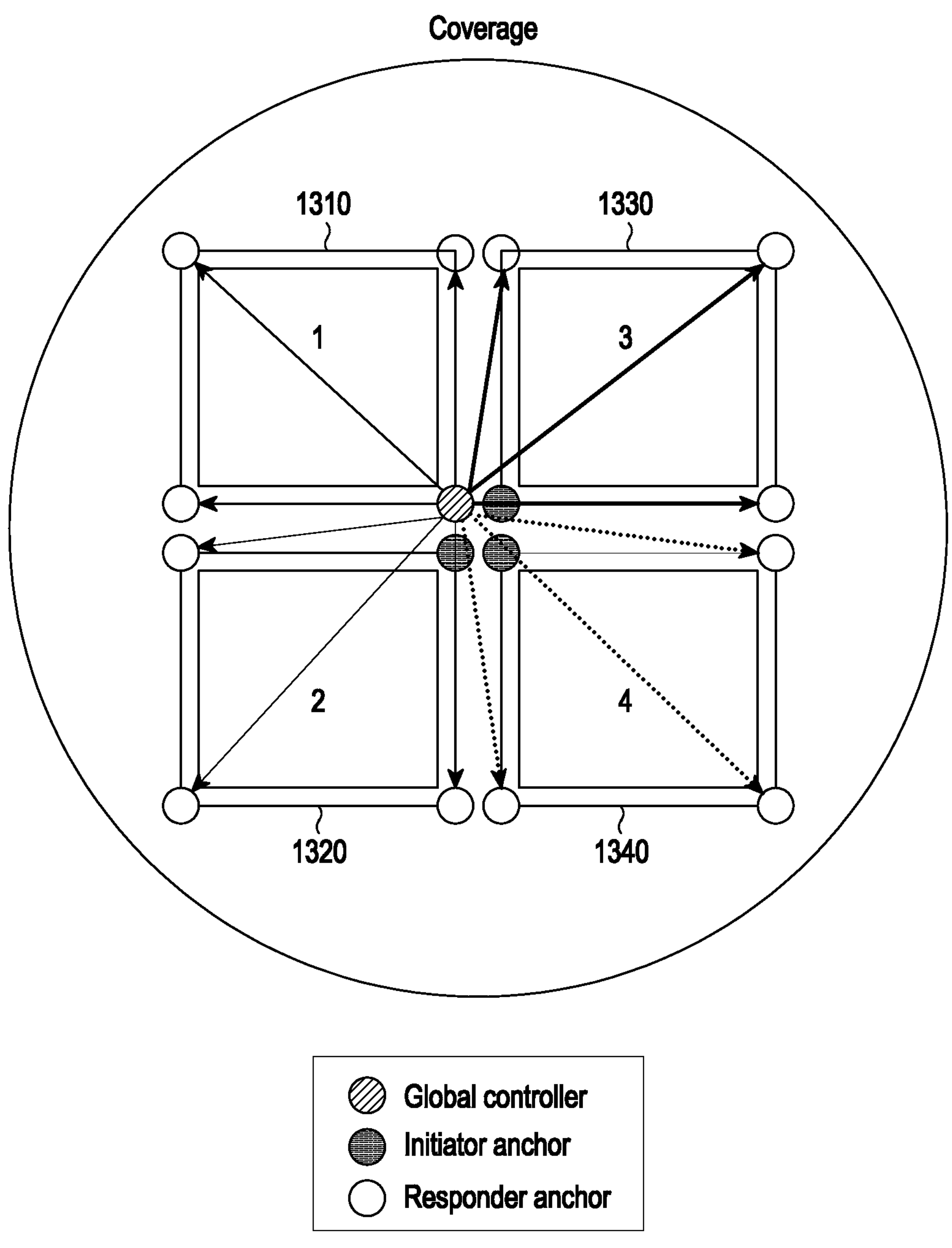
FIG. 13 illustrates a method for transmitting a runtime configuration message by a global controller according to an embodiment.

FIG. 13 illustrates a method for transmitting a runtime configuration message by a global controller according to an embodiment.

In FIG. 13, all of the clusters belonging to the multi-cluster are positioned within the communication coverage of the global controller.

In FIG. 13, the global controller may be one of the anchor devices constituting the multi-cluster. For example, the global controller may be the initiator anchor constituting the multi-cluster.

In FIG. 13, the global controller may include and transmit configuration information (runtime configuration information/multi-cluster configuration information) about the entire cluster (multi-cluster) in the runtime configuration message. For example, the global controller may include and transmit configuration information about each of a first cluster 1310, a second cluster 1320, a third cluster 1330, and a fourth cluster 1340 constituting the multi-cluster in the runtime configuration message.

The configuration information about each cluster may include information about what anchor devices the corresponding cluster is constituted of, information about the roles (e.g., initiator anchor or responder anchor) of the anchor devices, and/or information about the ranging round allocated for the cluster. The runtime configuration message may be, e.g., the runtime configuration messages 900*b* and 900*c* of FIG. 9B and FIG. 9C, respectively, the runtime configuration message 1000 of FIG. 10A, or the runtime configuration message 1100 of FIG. 11A.

All of the other anchor devices may receive runtime configuration messages and identify their own cluster and role. For example, the anchor device may identify that it plays a role as the initiator anchor belonging to the Nth cluster or the Mth responder anchor, based on the runtime configuration message. Further, the anchor device may identify the ranging round allocated for the Nth cluster where it belongs. In this case, the anchor device may perform the operation for TDoA according to the role set in the corresponding ranging round. For example, the anchor device may perform the TDoA operation as illustrated in FIG. 5A or 5B, according to the role set in the ranging round.

Figure 14:
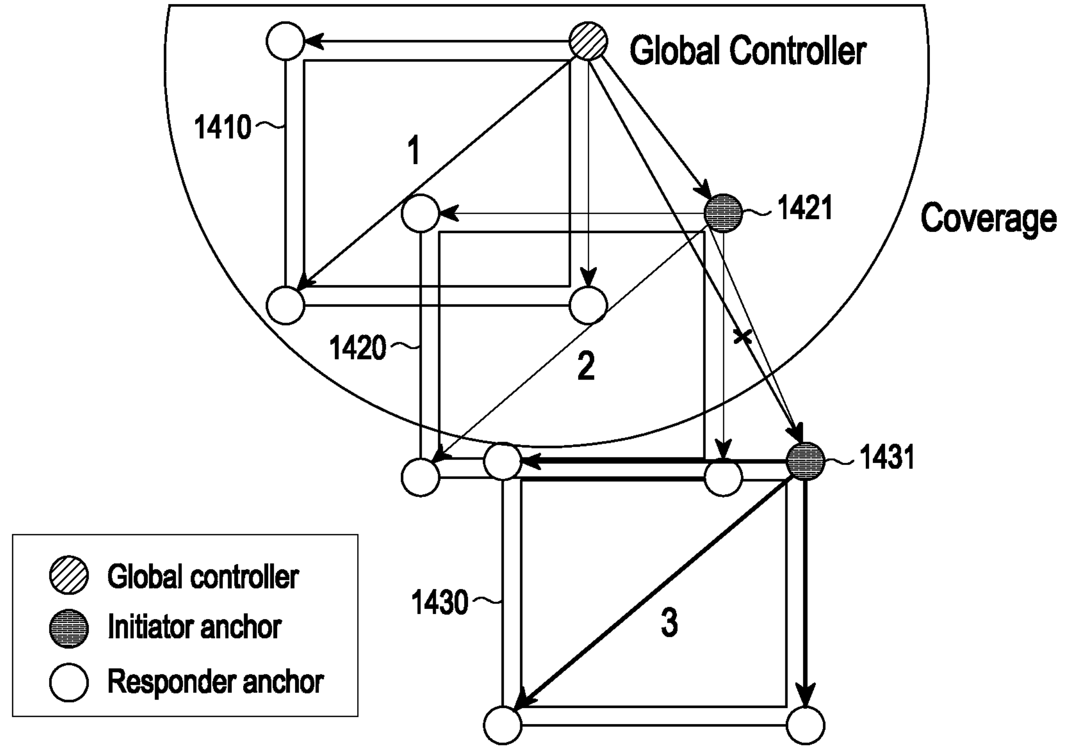
FIG. 14 illustrates a method for transmitting a runtime configuration message by a global controller according to an embodiment.

FIG. 14 illustrates a method for transmitting a runtime configuration message by a global controller according to an embodiment.

Unlike the embodiment of FIG. 13, at least one cluster in the embodiment of FIG. 14 may belong to a multi-cluster that is not located within the communication coverage of the global controller.

In FIG. 14, the global controller may be one of the anchor devices constituting the multi-cluster. For example, the global controller may be the initiator anchor constituting the multi-cluster.

In FIG. 14, the global controller may include and transmit configuration information about the entire cluster (multi-cluster) in the runtime configuration message. For example, the global controller may include and transmit configuration information about each of a first cluster 1410, a second cluster 1420, and a third cluster 1430 constituting the multi-cluster in the runtime configuration message.

The configuration information about each cluster may include information about what anchor devices the corresponding cluster is constituted of, information about the roles (e.g., initiator anchor or responder anchor) of the anchor devices, and/or information about the ranging round allocated for the cluster. The runtime configuration message may be, e.g., the runtime configuration messages 900*b* and 900*c* of FIG. 9B and FIG. 9C, respectively, the runtime configuration message 1000 of FIG. 10A, or the runtime configuration message 1100 of FIG. 11A.

The anchor device located in the communication coverage of the global controller may receive runtime configuration messages and identify their own cluster and role. For example, the anchor device may identify that it plays a role as the initiator anchor belonging to the Nth cluster or the Mth responder anchor, based on the runtime configuration message. For example, as shown in FIG. 14, anchor device 1421 may identify that it serves as the initiator anchor belonging to the second cluster 1420 based on the runtime configuration message received from the global controller. The anchor device may identify the ranging round allocated for the Nth cluster where it belongs.

Thereafter, the anchor device, which has identified serving as the initiator anchor, may include and transmit the whole or part of the information included in the received runtime configuration message in the runtime configuration message. Thus, anchor devices, which are located outside of the communication coverage of the global controller and fail to receive the runtime configuration message transmitted from the global controller, may be able to receive the runtime configuration message including configuration information about their cluster. For example, as shown in FIG. 14, anchor device 1431 does not receive the runtime configuration message from the global controller, but may identify that it serves as the initiator anchor belonging to the third cluster 1420 based on the runtime configuration message received from the anchor device 1421. In this case, the anchor device 1431 may include and transmit the whole or part of the information included in the received runtime configuration message in the runtime configuration message. Thus, the responder anchors belonging to the same cluster and/or the initiator anchor/responder anchors belonging to different adjacent clusters may identify their cluster and role.

Through the iterative transfer process (relay process) by the initiator anchor, all the anchor devices may identify their cluster and role. Thereafter, the anchor device may perform the operation for TDoA according to the role set in the corresponding ranging round. For example, the anchor device may perform the TDoA operation as illustrated in FIG. 5A or 5B according to the role set in the ranging round.

Figure 15:
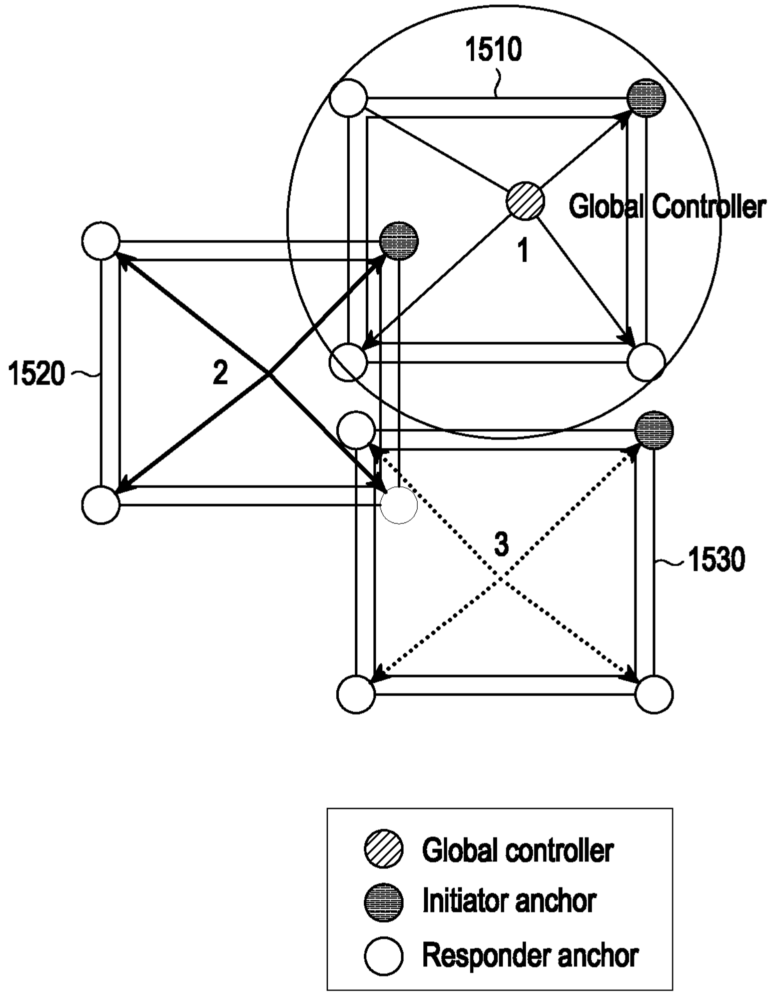
FIG. 15 illustrates a method for transmitting a runtime configuration message by a global controller according to an embodiment.

FIG. 15 illustrates a method for transmitting a runtime configuration message by a global controller according to an embodiment.

In FIG. 15, unlike the embodiments of FIG. 13 and FIG. 14, the global controller may be an electronic device other than the anchor devices constituting the multi-cluster. For example, the global controller may be a tag device (e.g., the user's mobile device) that does not constitute the multi-cluster.

In FIG. 15, the global controller may include and transmit configuration information about the entire cluster in the runtime configuration message. For example, the global controller may include and transmit cluster configuration information about each of a first cluster 1510, a second cluster 1520, and a third cluster 1530 constituting the multi-cluster in the runtime configuration message.

The configuration information about each cluster may include information about what anchor devices the corresponding cluster is constituted of, information about the roles (e.g., initiator anchor or responder anchor) of the anchor devices, and/or information about the ranging round allocated for the cluster. The runtime configuration message may be, e.g., the runtime configuration messages 900*b* and 900*c* of FIG. 9B and FIG. 9C, respectively, the runtime configuration message 1000 of FIG. 10A, or the runtime configuration message 1100 of FIG. 11A.

The anchor device located in the communication coverage of the global controller may receive runtime configuration messages and identify their own cluster and role. For example, the anchor device may identify that it plays a role as the initiator anchor belonging to the Nth cluster or the Mth responder anchor, based on the runtime configuration message. As shown in FIG. 15, the anchor devices belonging to the first cluster 1510 located in the communication coverage of the global controller may identify that they play a role as the initiator anchor or Mth responder anchor belonging to the first cluster 1510 based on the runtime configuration message received from the global controller. Further, the anchor device may identify the ranging round allocated for the Nth cluster where it belongs.

Meanwhile, one global controller may not cover all of the clusters belonging to the multi-cluster. In this case, the entire coverage of the multi-cluster may be covered by setting a plurality of global controllers and allowing each global controller to transmit a runtime configuration message. For example, a global controller may be set in the corresponding area of each of the first cluster 1510, the second cluster 1520, and the third cluster 153. Each global controller may transmit a runtime configuration message. Thus, anchor devices in the corresponding area may identify their clusters and roles. The runtime configuration message transmitted by each global controller may be the same message.

Alternatively, when the global controller is a mobile electronic device (tag device), the global controller may relocate and transmit runtime configuration messages to the anchor devices in the communication coverage in the corresponding location. For example, the global controller may move to the location where the second cluster 1520 and/or the third cluster 1530 are located in the communication coverage of the global cluster and transmit the runtime configuration message to the anchor devices of the second cluster 1520 and/or the third cluster 1530. Thus, all the anchor devices may identify their clusters and roles.

As another alternative embodiment, as in described in the embodiment of FIG. 14, all the anchor devices may identify their cluster and role through a way in which the initiator anchor receiving the runtime configuration message from the global controller transfers (relays) the runtime configuration message.

Thereafter, the anchor device may perform the operation for TDoA according to the role set in the corresponding ranging round. For example, the anchor device may perform the TDoA operation as in the embodiment of FIG. 5A or 5B according to the role set in the ranging round.

Figure 16:
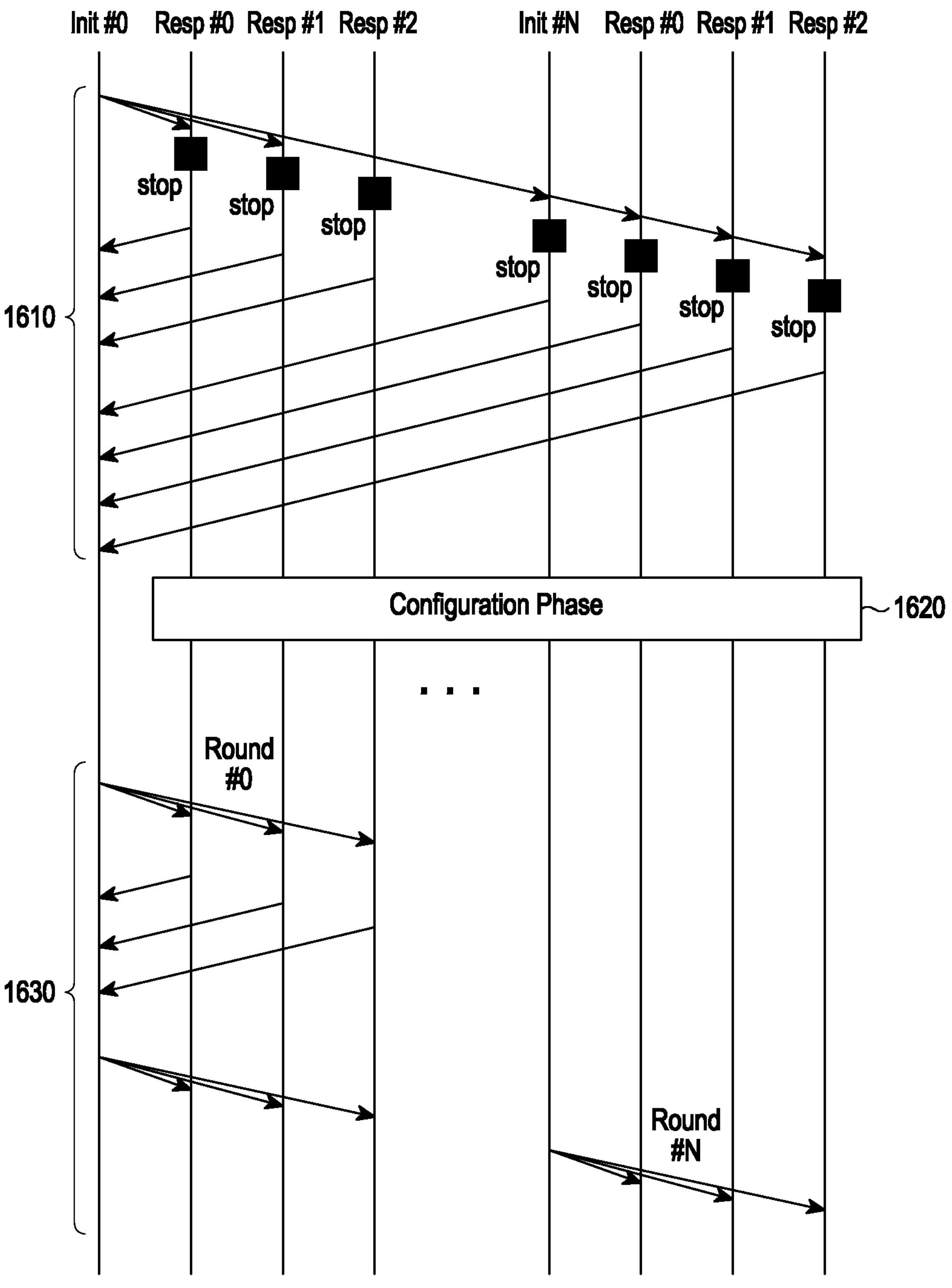
FIG. 16 illustrates a runtime configuration procedure according to an embodiment.

FIG. 16 illustrates a runtime configuration procedure according to an embodiment.

FIG. 16 provides an example of the embodiment of FIG. 13.

In FIG. 16, it is assumed that all the clusters belonging to the multi-cluster are located in the communication coverage of the global controller, as in the embodiment of FIG. 13.

In FIG. 16, the global controller may be one of the anchor devices constituting the multi-cluster. For example, as shown in FIG. 16, the global controller may be initiator anchor init #0 belonging to cluster #0.

Referring to FIG. 16, in phase 1610 (stop phase), the global controller init #0 transmits a stop message for stopping the TDoA (DL-TDoA) operation, and the anchor devices that have received the stop message stop the TDoA operation and transmit an ACK message to the global controller init #0.

In phase 1620 (configuration phase), the global controller may perform the operations of the configuration phase with other anchor devices. The operations of the configuration phase (e.g., operations 5 to 8 of FIG. 12 or operations 5 and 6 of FIG. 12) may be applied.

The global controller may transmit a configuration message to the other anchor devices. The configuration message may be, e.g., the runtime configuration messages 900*b* and 900*c* of 9B and FIG. 9C, respectively, the runtime configuration message 1000 of FIG. 10A, or the runtime configuration message 1100 of FIG. 11A. The configuration message may be included and transmitted in the payload 850 of the packet 800 of FIG. 8.

The other anchor devices may receive the configuration message and reinitialize/reset the multi-cluster configuration based on the configuration message. For example, the anchor device may change the role of the anchor and/or the cluster schedule based on the configuration message.

The global controller may transmit a restart message for restarting the TDoA operation to the other anchor devices.

The other anchor devices may receive the restart message and restart the TDoA operation.

In phase 1630 (TDoA phase), the anchor devices may perform the TDoA operation according to the role of the anchor device in the corresponding ranging round.

For example, anchor devices Init #0, Resp #0, Resp #1, and Resp #2 belonging to the 0th cluster may perform a message exchange operation for TDoA in ranging round #0. For example, the initiator anchor Init #0 may transmit an initiation message in a first slot (e.g., the first slot) of the ranging round #0, and each of the responder anchors Resp #0, Resp #1, and Resp #2 may transmit a response message to the initiation message in the corresponding slot of the ranging round #0. The slots in which the responder anchors transmit the response message may be scheduled by the initiation message of the initiator anchor. Further, after receiving the response messages, the initiator anchor Init #0 may transmit a final message in a second slot (e.g., the last slot) of the ranging round #0. In other clusters, the same operation may be performed in the corresponding ranging round. Similarly, the anchor devices belonging to the Nth cluster may perform the TDoA operation according to the role of the anchor device in the corresponding ranging round (ranging round #N).

Figure 17:
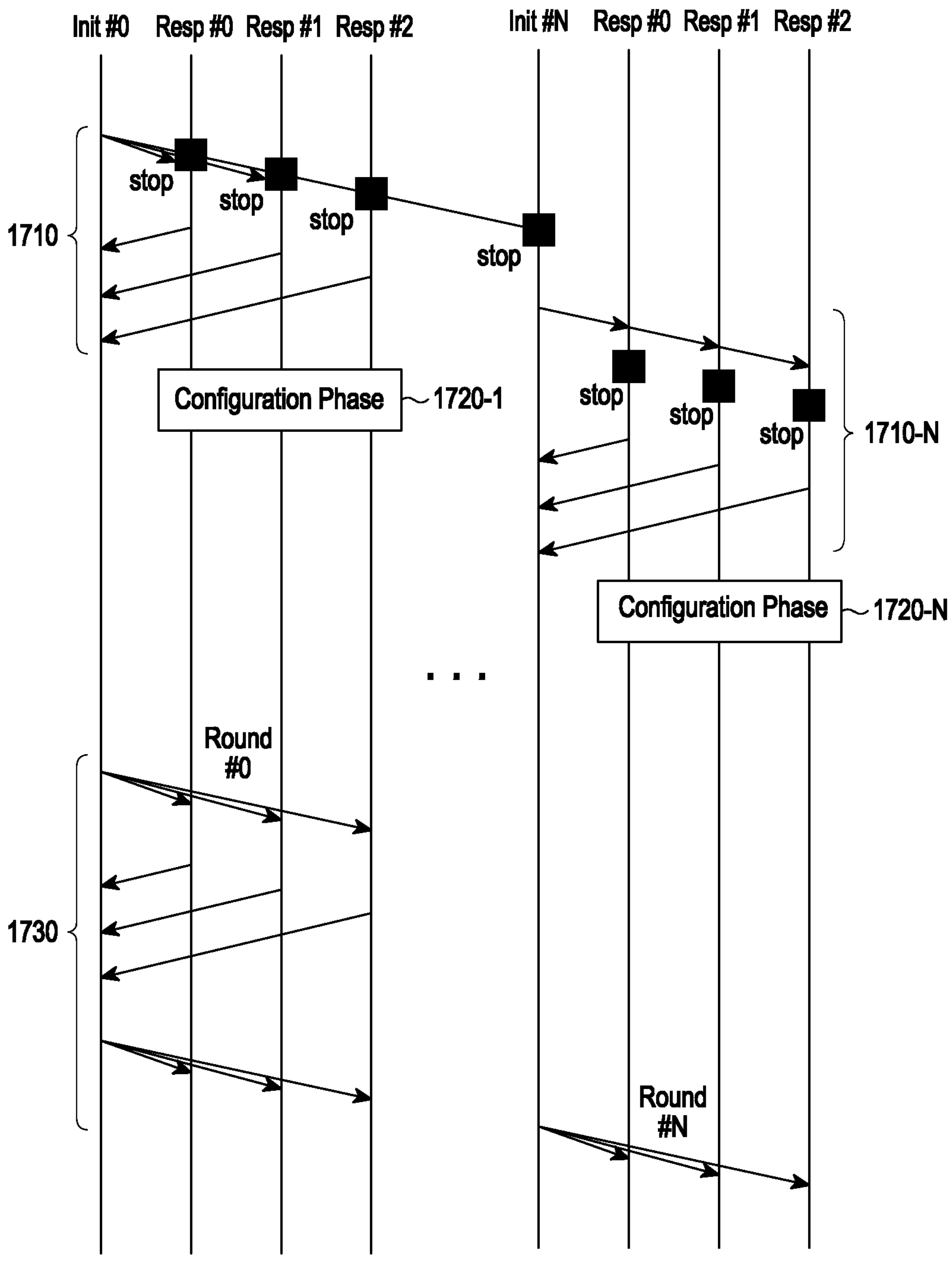
FIG. 17 illustrates a runtime configuration procedure according to an embodiment.

FIG. 17 illustrates a runtime configuration procedure according to an embodiment.

FIG. 17 provides an example of the embodiment of FIG. 14 in which the initiator anchor relays the configuration message.

Like the embodiment of FIG. 14, the embodiment of FIG. 17 assumes that some of the clusters belonging to the multi-cluster are not located within the communication coverage of the global controller.

In FIG. 17, the global controller may be one of the anchor devices constituting the multi-cluster. As shown in FIG. 17, the global controller may be initiator anchor init #0 belonging to cluster #0.

Referring to FIG. 17, in phase 1710-1 (preparation phase), the global controller init #0 may transmit a stop message for stopping the TDoA (DL-TDoA) operation, and the anchor devices that have received the stop message may stop the TDoA operation and transmit an ACK message to the global controller init #0.

In phase 1710-N, the initiator anchor Init #N of the Nth cluster that has received the stop message from the global controller init #0 may transfer the stop message. Thus, other anchors (e.g., Resp #0, Resp #1, and Resp #2 of the Nth cluster) that are not located within the communication coverage of the global controller init #0 may receive the stop message, stop the TDoA operation, and send an ACK message to the initiator anchor Init #N that sent the stop message. The initiator anchor Init #N may transfer the ACK message to the global cluster.

In phase 1720-1 (configuration phase), the global controller may perform the operations of the configuration phase with other anchor devices. The operations of the configuration phase (e.g., operations 5 to 8 of FIG. 12 or operations 5 and 6 of FIG. 12) may be applied.

The global controller Init #0 may transmit a configuration message to the other anchor devices. The configuration message may be, e.g., the runtime configuration messages 900*b* and 900*c* of FIG. B and FIG. 9C, respectively, the runtime configuration message 1000 of FIG. 10A, or the runtime configuration message 1100 of FIG. 11A. The configuration message may be included and transmitted in the payload 850 of the packet 800 of FIG. 8.

Other anchor devices (e.g., responder anchors belonging to the same cluster as the global controller Init #0 and initiator anchor Init #N belonging to a different cluster than the global controller Init #0) may receive the configuration message and reinitialize/reset the multi-cluster configuration based on the configuration message. For example, the anchor device may change the role of the anchor and/or the cluster schedule based on the configuration message.

The global controller may transmit a restart message for restarting the TDoA operation to the other anchor devices.

Other anchor devices (e.g., responder anchors belonging to the same cluster as the global controller Init #0 and initiator anchor Init #N belonging to a different cluster than the global controller Init #0) may receive the restart message and restart the TDoA operation.

In phase 1720-N (configuration phase), the initiator anchor Init #N receiving the configuration message from the global controller Init #0 may perform the operations of the configuration phase with the other anchor devices. The configuration phase operations (e.g., operations 5 to 8 of FIG. 12 or operations 5 and 6 of FIG. 12) may be applied.

The initiator anchor Init #N receiving the configuration message from the global controller Init #0 may transfer (relay) the configuration message.

Other anchor devices (e.g., responder anchors belonging to the same cluster as the initiator anchor Init #N and initiator anchor belonging to a different cluster than the initiator anchor Init #N) may receive the configuration message and reinitialize/reset the multi-cluster configuration based on the configuration message. For example, the anchor device may change the role of the anchor and/or the cluster schedule based on the configuration message.

The global controller may transmit a restart message for restarting the TDoA operation to the other anchor devices.

Other anchor devices (e.g., responder anchors belonging to the same cluster as the initiator anchor Init #N and initiator anchor belonging to a different cluster than the initiator anchor Init #N) may receive the restart message and restart the TDoA operation.

In phase 1730 (TDoA phase), the anchor devices may perform the TDoA operation according to the role of the anchor device in the corresponding ranging round.

For example, anchor devices Init #0, Resp #0, Resp #1, and Resp #2 belonging to the 0th cluster may perform a message exchange operation for TDoA in ranging round #0. For example, the initiator anchor Init #0 may transmit an initiation message in a first slot (e.g., the first slot) of the ranging round #0, and each of the responder anchors Resp #0, Resp #1, and Resp #2 may transmit a response message to the initiation message in the corresponding slot of the ranging round #0. The slots in which the responder anchors transmit the response message may be scheduled by the initiation message of the initiator anchor. After receiving the response messages, the initiator anchor Init #0 transmits a final message in a second slot (e.g., the last slot) of the ranging round #0. In other clusters, the same operation may be performed in the corresponding ranging round. Similarly, the anchor devices belonging to the Nth cluster perform the TDoA operation according to the role of the anchor device in the corresponding ranging round (ranging round #N) according to the above-described method.

Figure 18:
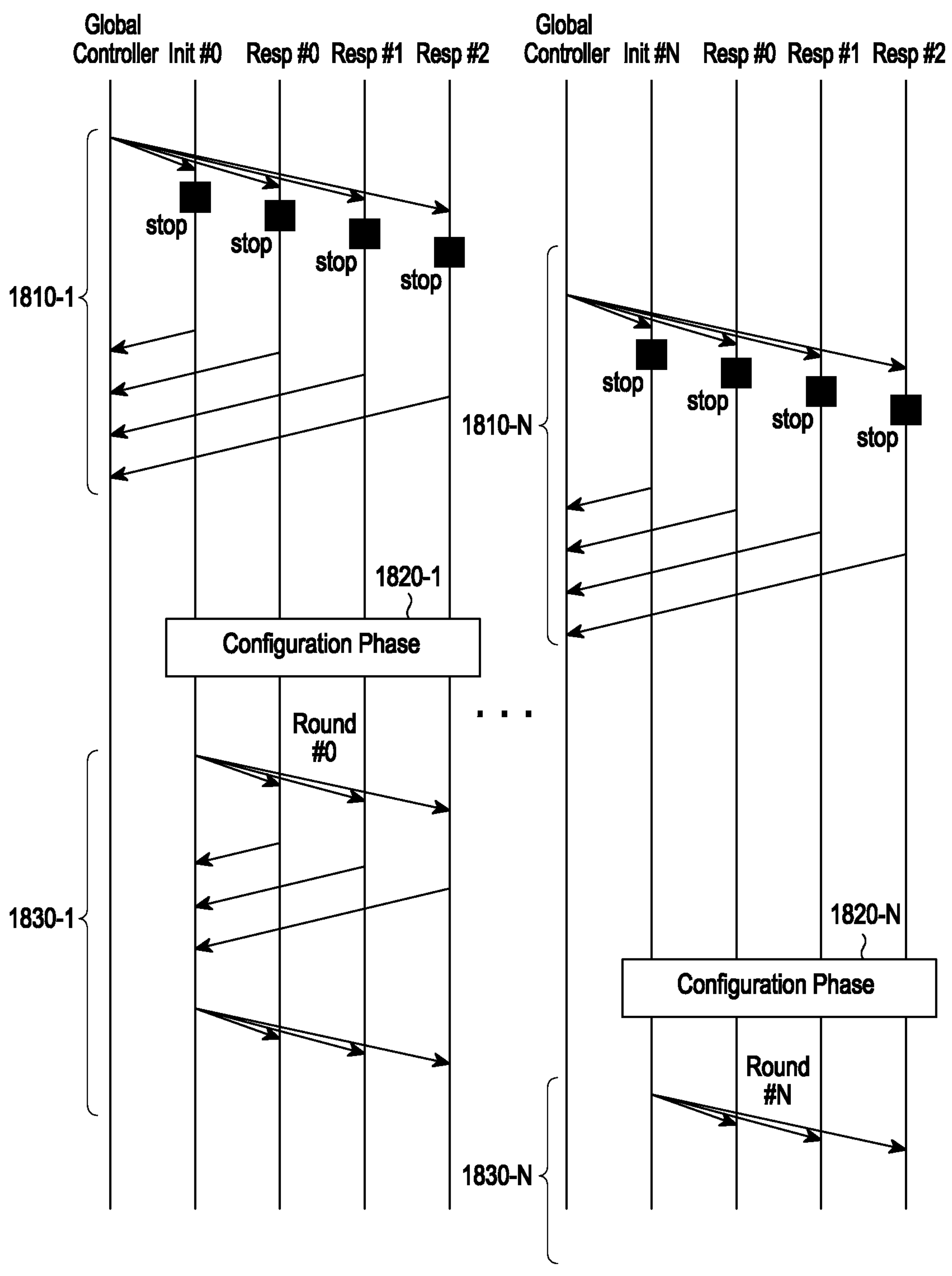
FIG. 18 illustrates a runtime configuration procedure according to an embodiment.

FIG. 18 illustrates a runtime configuration procedure according to an embodiment. Specifically, FIG. 18 provides an example of the embodiment of FIG. 15.

In the embodiment of FIG. 18, like the embodiment of FIG. 15, it is assumed that the global controller is an electronic device other than the anchor devices constituting the multi-cluster. For example, the global controller may be a tag device (e.g., the user's mobile device) that does not constitute the multi-cluster.

In FIG. 18, there may be a plurality of global controllers. The number of the global controllers may be determined based on the communication coverage of the global controllers. Although FIG. 18 discloses an example in which a separate global controller is used for each cluster, FIG. 18 is merely an example, and one global controller may be used for a plurality of clusters.

Referring to FIG. 18, in phase 1810-1 (stop phase), the first global controller may transmit a stop message for stopping the TDoA operation to the anchor devices of the associated cluster (e.g., the cluster within the communication coverage of the first global controller), and the anchor devices receiving the stop message may stop the TDoA operation and transmit an ACK message to the first global controller. Similarly, in phase 1810-N, the Nth global controller may transmit a stop message for stopping the TDoA operation to the anchor devices of the cluster within the communication coverage of the Nth global controller, and the anchor devices receiving the stop message may stop the TDoA operation and transmit an ACK message to the Nth global controller.

In phase 1820-1 (configuration phase), the first global controller may perform the operations of the configuration phase with the anchor devices (e.g., Init #0 and Resp #0, Resp #1, and Resp #2 belonging to the same cluster as Init #0) of the associated cluster. The configuration phase operations (e.g., operations 5 to 8 of FIG. 12 or operations 5 and 6 of FIG. 12) may be applied.

The first global controller may transmit the configuration message to the anchor devices of the associated cluster. As an embodiment, the configuration message may be, e.g., the runtime configuration messages 900*b* and 900*c* of FIG. 9B and FIG. 9C, respectively, the runtime configuration message 1000 of FIG. 10A, or the runtime configuration message 1100 of FIG. 11A. The configuration message may be included and transmitted in the payload 850 of the packet 800 of FIG. 8.

The anchor devices receive the configuration message and reinitialize/reset the multi-cluster configuration based on the configuration message. For example, the anchor device may change the role of the anchor and/or the cluster schedule based on the configuration message.

The first global controller may transmit a restart message for restarting the TDoA operation to the anchor devices of the associated cluster.

The anchor devices may receive the restart message and restart the TDoA operation using the restart message.

Likewise, in phase 1810-N, the Nth global controller may perform the above-described operations of the configuration phase with the anchor devices (e.g., Init #N and Resp #0, Resp #1, and Resp #2 belonging to the same cluster as Init #N) of the associated cluster.

In phase 1830-1 (TDoA phase), the anchor devices belonging to the 0th cluster may perform the TDoA operation according to the role of the anchor device in the corresponding ranging round (ranging round #0).

For example, anchor devices Init #0, Resp #0, Resp #1, and Resp #2 belonging to the 0th cluster may perform a message exchange operation for TDoA in ranging round #0. For example, the initiator anchor Init #0 may transmit an initiation message in a first slot (e.g., the first slot) of the ranging round #0, and each of the responder anchors Resp #0, Resp #1, and Resp #2 transmit a response message to the initiation message in the corresponding slot of the ranging round #0. The slots in which the responder anchors transmit the response message may be scheduled by the initiation message of the initiator anchor. After receiving the response messages, the initiator anchor Init #0 may transmit a final message in a second slot (e.g., the last slot) of the ranging round #0. In other clusters, the same operation may be performed in the corresponding ranging round.

Similarly, in phase 1820-N, the anchor devices belonging to the Nth cluster may perform the TDoA operation according to the role of the anchor device in the corresponding ranging round (ranging round #N) according to the above-described method.

Figure 19:
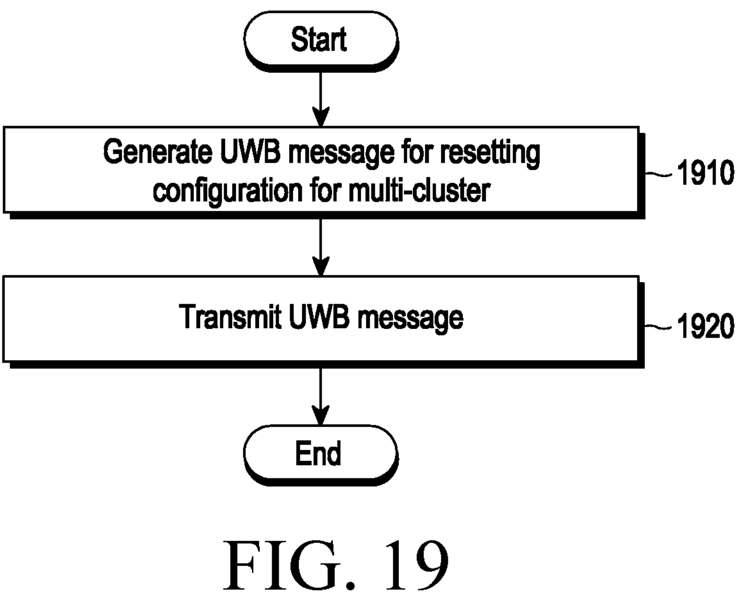
FIG. 19 is a flowchart illustrating a method by a global controller according to an embodiment.

FIG. 19 is a flowchart illustrating a method for a first UWB device according to an embodiment.

In FIG. 19, the first UWB device may be a global controller.

Referring to FIG. 19, in step 1910 the first UWB device generates a UWB message for resetting the configuration for multi-cluster.

In step 1920, the first UWB device transmits a UWB message.

The UWB message may include information used to indicate that the UWB message is a configuration message for resetting the configuration for the multi-cluster.

The information used to indicate that the UWB message is the configuration message including flag information indicating whether at least one configuration parameter for the multi-cluster configuration is present in the UWB message.

The information used to indicate that the UWB message is the configuration message may further include type information indicating whether the UWB message is a management message.

When the flag information indicates that at least one configuration parameter for the multi-cluster configuration is present in the UWB message, the UWB message may include configuration parameter information including the at least one configuration parameter.

The configuration parameter information may include at least one of round index information, initiator anchor index information, or responder anchor index information for each of the clusters constituting the multi-cluster.

The UWB message may be transmitted through the payload of the packet to which static STS configuration and STS packet configuration 1 are applied.

The first UWB device may be one of the anchor devices belonging to the multi-cluster or a tag device not belonging to the multi-cluster.

Figure 20:
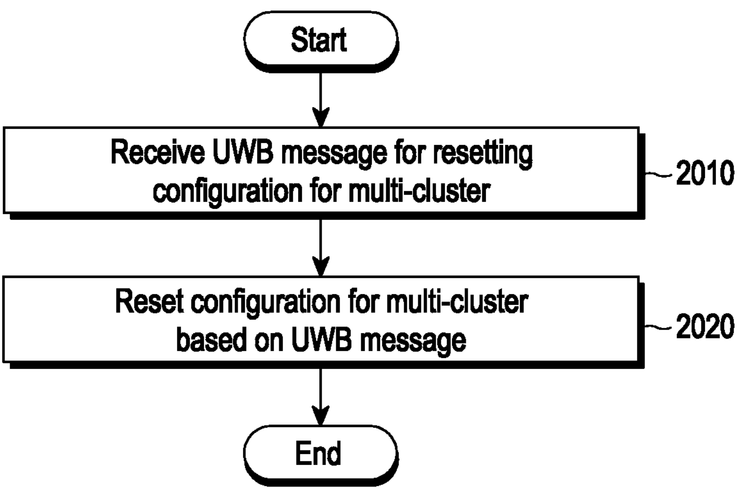
FIG. 20 is a flowchart illustrating a method by an anchor device according to an embodiment.

FIG. 20 is a flowchart illustrating a method of a second UWB device according to an embodiment.

In FIG. 20, the first UWB device may be a global controller, and the second UWB device may be an anchor device (e.g., initiator anchor/responder anchor) belonging to the multi-cluster.

Referring to FIG. 20, in step 2010, the second UWB device receives a UWB message for resetting the configuration for the multi-cluster from the first UWB device.

In step 2020, the second UWB device resets the configuration for the multi-cluster based on the UWB message.

When the second UWB device is identified as the initiator anchor based on the UWB message, the second UWB device transmits the UWB message to another UWB device.

The UWB message may include information used to indicate that the UWB message is a configuration message for resetting the configuration for the multi-cluster.

The information used to indicate that the UWB message is the configuration message may include flag information indicating whether at least one configuration parameter for the multi-cluster configuration is present in the UWB message.

The information used to indicate that the UWB message is the configuration message may further include type information indicating whether the UWB message is a management message.

When the flag information indicates that at least one configuration parameter for the multi-cluster configuration is present in the UWB message, the UWB message may include configuration parameter information including the at least one configuration parameter.

The configuration parameter information may include at least one of round index information, initiator anchor index information, or responder anchor index information for each of the clusters constituting the multi-cluster.

The UWB message may be transmitted through the payload of the packet to which static STS configuration and STS packet configuration 1 are applied.

The first UWB device may be one of the anchor devices belonging to the multi-cluster or a tag device not belonging to the multi-cluster.

Figure 21:
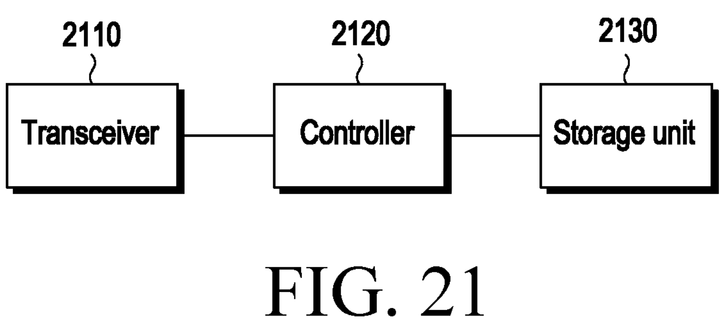
FIG. 21 is a block diagram illustrating a first UWB device according to an embodiment.

FIG. 21 is a block diagram illustrating a first UWB device according to an embodiment.

In FIG. 21, the first UWB device may be a global controller.

Referring to FIG. 21, the first UWB device may include a transceiver 2110, a controller 2120, and a storage unit 2130. The controller may be a circuit or application-specific integrated circuit or at least one processor.

The transceiver 2110 is configured to transmit and receive signals to/from another entity. The transceiver 2110 is also configured to transmit/receive data to/from another UWB device through, e.g., UWB communication or OOB communication (e.g., BLE communication).

The controller 2120 is configured to control the overall operation of the electronic device. For example, the controller 2120 is configured to control inter-block signal flow to perform the operations described herein. Specifically, the controller 2120 is configured to control the operations (e.g., the operations of the global controller) of the first UWB device described herein.

The storage unit 2130 is configured to store at least one of information transmitted/received via the transceiver 2110 and information generated via the controller 2120. For example, the storage unit 2130 is configured to store information and data (e.g., configuration message-related information) necessary for the methods described herein.

Figure 22:
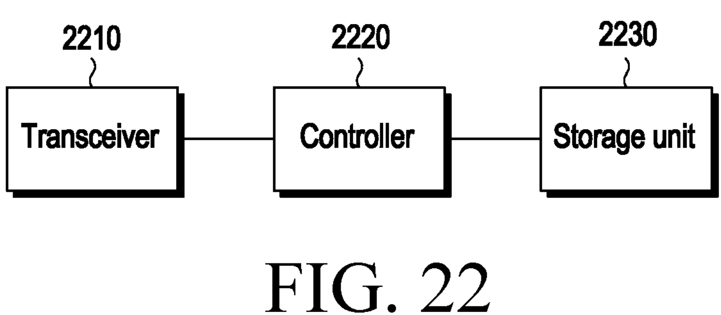
FIG. 22 is a block diagram illustrating a second UWB device according to an embodiment.

FIG. 22 is a block diagram illustrating a second UWB device according to an embodiment.

In FIG. 22, the second UWB device may be an anchor device.

Referring to FIG. 22, the second UWB device may include a transceiver 2210, a controller 2220, and a storage unit 2230. The controller may be an application-specific integrated circuit or at least one processor.

The transceiver 2210 is configured to transmit and receive signals to/from another entity. The transceiver 2210 is also configured to transmit/receive data to/from another UWB device through, e.g., UWB communication or OOB communication (e.g., BLE communication).

The controller 2220 is configured to control the overall operation of the electronic device. For example, the controller 2220 is configured to control inter-block signal flow to perform the operations described herein. Specifically, the controller 2220 is configured to control the operations (e.g., the operations of the anchor device in the multi-cluster) of the second UWB device described herein.

The storage unit 2230 is configured to store at least one of information transmitted/received via the transceiver 2210 and information generated via the controller 2220. For example, the storage unit 2230 is configured to store information and data (e.g., configuration message-related information) necessary for the method described herein.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms, e.g., a, an, and the, are intended to include the plural forms as well, unless the context clearly indicates otherwise.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by an ultra-wide band (UWB) device, the method comprising:

generating a UWB message related to a configuration of a multi-cluster; and transmitting the UWB message, wherein the UWB message includes UWB message identifier (ID) information set to a value indicating that the UWB message is a one-way ranging (OWR) message and OWR message type information set to a value indicating that a type of the OWR message is a management message, wherein the UWB message includes configuration parameter information for each cluster included in the multi-cluster, wherein the configuration parameter information includes a round index parameter, an initiator anchor parameter, and a responder anchor list parameter, wherein the round index parameter indicates a ranging round to be allocated to a cluster included in the multi-cluster, wherein the initiator anchor parameter indicates identification information for an initiator anchor of the ranging round for the cluster, the cluster operating in the ranging round identified by the round index parameter, and wherein the responder anchor list parameter indicates identification information for at least one responder anchor in the cluster operating in the ranging round identified by the round index parameter.

2. The method of claim 1, wherein the UWB message includes flag information indicating whether the configuration parameter information including at least one configuration parameter for the configuration of multi-cluster is present in the UWB message.

3. The method of claim 2, wherein in case that the flag information indicates that the configuration parameter information is present in the UWB message, the UWB message includes the configuration parameter information.

4. The method of claim 1, wherein the UWB message includes type information indicating one of types of the management message, and wherein the types of management messages include:

a first type indicating that the management message is a configuration message;

a second type indicating that the management message is a stop message, and a third type indicating that the management message is a restart message.

5. The method of claim 4, wherein the types of management messages further include a fourth type indicating that the management message is an ACK message.

6. The method of claim 1, wherein the UWB message is transmitted through a payload of a packet to which a static scrambled timestamp sequence (STS) configuration and STS packet configuration 1 are applied.

7. The method of claim 1, wherein the UWB device is one of an anchor device belonging to the multi-cluster or a tag device not belonging to the multi-cluster.

8. A method performed by a second ultra-wide band (UWB) device, the method comprising:

receiving, from a first UWB device, a UWB message related to a configuration of a multi-cluster; and applying the configuration of the multi-cluster based on the UWB message, wherein the UWB message includes UWB message identifier (ID) information set to a value indicating that the UWB message is a one-way ranging (OWR) message and OWR message type information set to a value indicating that a type of the OWR message is a management message, wherein the UWB message includes configuration parameter information for each cluster included in the multi-cluster, wherein the configuration parameter information includes a round index parameter, an initiator anchor parameter, and a responder anchor list parameter, wherein the round index parameter indicates a ranging round to be allocated to a cluster included in the multi-cluster, wherein the initiator anchor parameter indicates identification information for an initiator anchor of the ranging round for the cluster, the cluster operating in the ranging round identified by the round index parameter, and wherein the responder anchor list parameter indicates identification information for at least one responder anchor in the cluster operating in the ranging round identified by the round index parameter.

9. The method of claim 8, wherein the UWB message includes flag information indicating whether the configuration parameter information including at least one configuration parameter for the configuration of multi-cluster is present in the UWB message.

10. The method of claim 9, wherein in case that the flag information indicates that the configuration parameter information is present in the UWB message, the UWB message includes the configuration parameter information.

11. The method of claim 8, wherein the UWB message includes type information indicating one of types of the management message, and wherein the types of management messages include:

a first type indicating that the management message is a configuration message;

a second type indicating that the management message is a stop message, and a third type indicating that the management message is a restart message.

12. The method of claim 11, wherein the types of management messages further include a fourth type indicating that the management message is an ACK message.

13. The method of claim 8, wherein the UWB message is transmitted through a payload of a packet to which a static scrambled timestamp sequence (STS) configuration and STS packet configuration 1 are applied.

14. The method of claim 8, wherein the first UWB device is one of an anchor device belonging to the multi-cluster or a tag device not belonging to the multi-cluster.

15. The method of claim 8, further comprising transmitting the UWB message to another UWB device in case that the second UWB device is identified as an initiator anchor based on the UWB message.

16. An ultra-wide band (UWB) device, comprising:

a transceiver; and at least one processor configured to:

generate a UWB message related to a configuration of a multi-cluster; and transmit the UWB message, wherein the UWB message includes UWB message identifier (ID) information set to a value indicating that the UWB message is a one-way ranging (OWR) message and OWR message type information set to a value indicating that a type of the OWR message is a management message, wherein the UWB message includes configuration parameter information for each cluster included in the multi-cluster, wherein the configuration parameter information includes a round index parameter, an initiator anchor parameter, and a responder anchor list parameter, wherein the round index parameter indicates a ranging round to be allocated to a cluster included in the multi-cluster, wherein the initiator anchor parameter indicates identification information for an initiator anchor of the ranging round for the cluster, the cluster operating in the ranging round identified by the round index parameter, and wherein the responder anchor list parameter indicates identification information for at least one responder anchor in the cluster operating in the ranging round identified by the round index parameter.

17. The UWB device of claim 16, wherein the UWB message includes flag information indicating whether the configuration parameter information including at least one configuration parameter for the configuration of multi-cluster is present in the UWB message.

18. The UWB device of claim 17, wherein, in case that the flag information indicates that the configuration parameter information is present in the UWB message, the UWB message includes the configuration parameter information.

19. The UWB device of claim 16, wherein the UWB message includes type information indicating one of types of the management message, and wherein the types of management messages include:

a first type indicating that the management message is a configuration message;

a second type indicating that the management message is a stop message, and a third type indicating that the management message is a restart message.

20. A second ultra-wide band (UWB) device, comprising:

a transceiver; and at least one processor configured to:

receive, from a first UWB device, a UWB message related to a configuration of a multi-cluster; and apply the configuration of the multi-cluster based on the UWB message, wherein the UWB message includes UWB message identifier (ID) information set to a value indicating that the UWB message is a one-way ranging (OWR) message and OWR message type information set to a value indicating that a type of the OWR message is a management message, wherein the UWB message includes configuration parameter information for each cluster included in the multi-cluster, wherein the configuration parameter information includes a round index parameter, an initiator anchor parameter, and a responder anchor list parameter, wherein the round index parameter indicates a ranging round to be allocated to a cluster included in the multi-cluster, wherein the initiator anchor parameter indicates identification information for an initiator anchor of the ranging round for the cluster, the cluster operating in the ranging round identified by the round index parameter, and wherein the responder anchor list parameter indicates identification information for at least one responder anchor in the cluster operating in the ranging round identified by the round index parameter.

* * * * *